US012620183B2

(12) United States Patent
McLachlan et al.

(10) Patent No.: US 12,620,183 B2
(45) Date of Patent: May 5, 2026

(54) MOVING MEDIA IN EXTENDED REALITY

(71) Applicant: Telefonaktiebolaget LM Ericsson (publ), Stockholm (SE)

(72) Inventors: Paul McLachlan, San Francisco, CA (US); Héctor Caltenco, Oxie (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 304 days.

(21) Appl. No.: 18/263,706

(22) PCT Filed: Mar. 11, 2021

(86) PCT No.: PCT/IB2021/052054
§ 371 (c)(1),
(2) Date: Jul. 31, 2023

(87) PCT Pub. No.: WO2022/189832
PCT Pub. Date: Sep. 15, 2022

(65) Prior Publication Data
US 2024/0071011 A1 Feb. 29, 2024

(51) Int. Cl.
*G06T 19/00* (2011.01)
*G06T 7/70* (2017.01)
*G06Q 30/0241* (2023.01)

(52) U.S. Cl.
CPC .............. *G06T 19/006* (2013.01); *G06T 7/70* (2017.01); *G06Q 30/0241* (2013.01)

(58) Field of Classification Search
None
See application file for complete search history.

(56) References Cited

U.S. PATENT DOCUMENTS 8,527,341 B2     9/2013 Feuerstein et al.
2006/0136491 A1*  6/2006 Berkner ............... G06V 30/416
                                                707/E17.093
(Continued)

FOREIGN PATENT DOCUMENTS

CN       110892364 A      3/2020
WO     2015/192117 A1    12/2015
WO     2021/115595 A1     6/2021

OTHER PUBLICATIONS

"OpenRTB 3.0 Framework, Launching Secure Supply Chain Standards", Sep. 2017, 36 pages, IAB Tech Lab, available online at <https://iabtechlab.com/wp-content/uploads/2017/09/OpenRTB-3.0-Draft-Framework-for-Public-Comment.pdf>.
(Continued)

*Primary Examiner* — Martin Mushambo
(74) *Attorney, Agent, or Firm* — Nicholson De Vos Webster & Elliott LLP

(57) ABSTRACT

A method of a system of one or more electronic devices supports an extended reality application at a user device. The method includes receiving location and pose information of the user device related to an extended reality environment, determining at least one dynamic content unit relevant to the location and pose information, determining a range of motion of the at least one dynamic content unit, determining semantic information for the location and pose of the user device, generating a semantic map from the semantic information, applying at least one access control to the semantic map to prevent display of dynamic content on the dynamic content unit at a location in the semantic map, querying a dynamic content manager for dynamic content to be displayed as an extended reality overlay, and returning the dynamic content to the user device.

18 Claims, 12 Drawing Sheets

(56) References Cited

U.S. PATENT DOCUMENTS

| | | | | |
|---|---|---|---|---|
| 2009/0300002 A1* | 12/2009 | Thomas | G06F 16/2457 | |
| | | | 707/999.005 | |
| 2011/0063301 A1* | 3/2011 | Setlur | G09B 29/007 | |
| | | | 345/441 | |
| 2015/0143459 A1* | 5/2015 | Molnar | H04L 67/02 | |
| | | | 726/2 | |
| 2015/0302652 A1* | 10/2015 | Miller | G06T 13/80 | |
| | | | 345/419 | |
| 2016/0371591 A1* | 12/2016 | Reddy | G06N 5/022 | |
| 2019/0094981 A1* | 3/2019 | Bradski | G06V 40/168 | |
| 2019/0259033 A1* | 8/2019 | Reddy | G06N 3/08 | |
| 2020/0061839 A1* | 2/2020 | Deyle | G06Q 10/087 | |
| 2020/0068235 A1* | 2/2020 | Han | H04N 21/21805 | |
| 2020/0077035 A1* | 3/2020 | Yao | G06V 20/52 | |
| 2020/0193717 A1 | 6/2020 | Daly | | |
| 2020/0404078 A1* | 12/2020 | Iyer | H04W 4/021 | |
| 2021/0004200 A1 | 1/2021 | Swaminathan et al. | | |
| 2021/0342479 A1* | 11/2021 | Schluntz | H04L 63/107 | |
| 2021/0405638 A1* | 12/2021 | Boyraz | G06V 20/64 | |
| 2022/0156303 A1* | 5/2022 | De Sousa Webber | | |
| | | | G06F 16/334 | |
| 2022/0404620 A1* | 12/2022 | Phillips | G06F 3/011 | |
| 2023/0290086 A1* | 9/2023 | Hariton | G06T 19/006 | |
| 2023/0298468 A1* | 9/2023 | Jha | G08G 1/164 | |
| | | | 701/117 | |
| 2023/0377460 A1* | 11/2023 | Sivanesan | G08G 1/143 | |

OTHER PUBLICATIONS

"Real Time Bidding (RTB) Project, OpenRTB API Specification Version 2.5", Dec. 2016, 80 pages, IAB Technology Laboratory, available online at <https://iabtechlab.com/wp-content/uploads/2016/07/OpenRTB-API-Specification-Version-2-5-FINAL.pdf>.

Aaron Luber, "Immersive branded experiences in YouTube and display ads", Jun. 18, 2019, 5 pages, available online at <https://blog.google/products/marketingplatform/360/immersive-branded-experiences-youtube-and-display-ads/?_ga=2.19011643.263579917.1566979056-1789955448.1566979056>.

Nantheera Anantrasirichai et al., "Artificial Intelligence in the Creative Industries: A Review", Artificial Intelligence Review, vol. 55, 2020, pp. 589-656.

Rashi Verma, "Deliver more interactive ad experiences with Display & Video 360", Jun. 18, 2019, 6 pages, available online at <https://blog.google/products/marketingplatform/360/deliver-more-interactive-ad-experiences-display-video-360/>.

Rashmita Behera, "What is a Demand-Side Platform (DSP)?" Jun. 3, 2019, 11 pages, AdPushup Inc., downloaded from https://www.adpushup.com/blog/what-is-demand-side-platform/ on Sep. 3, 2019.

* cited by examiner

Static Content Unit ID =
123456789
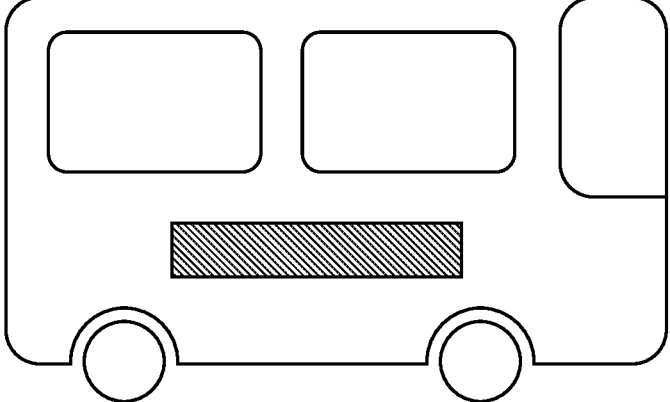
Dynamic Content Unit ID =
123456789
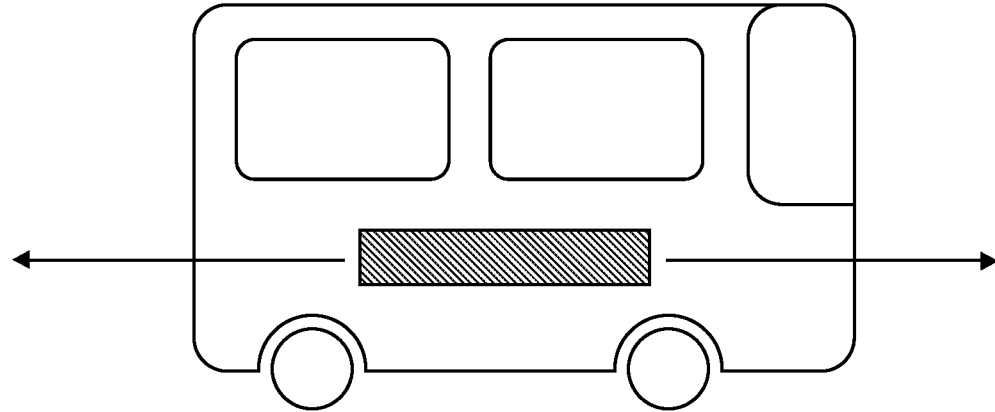
FIG. 1

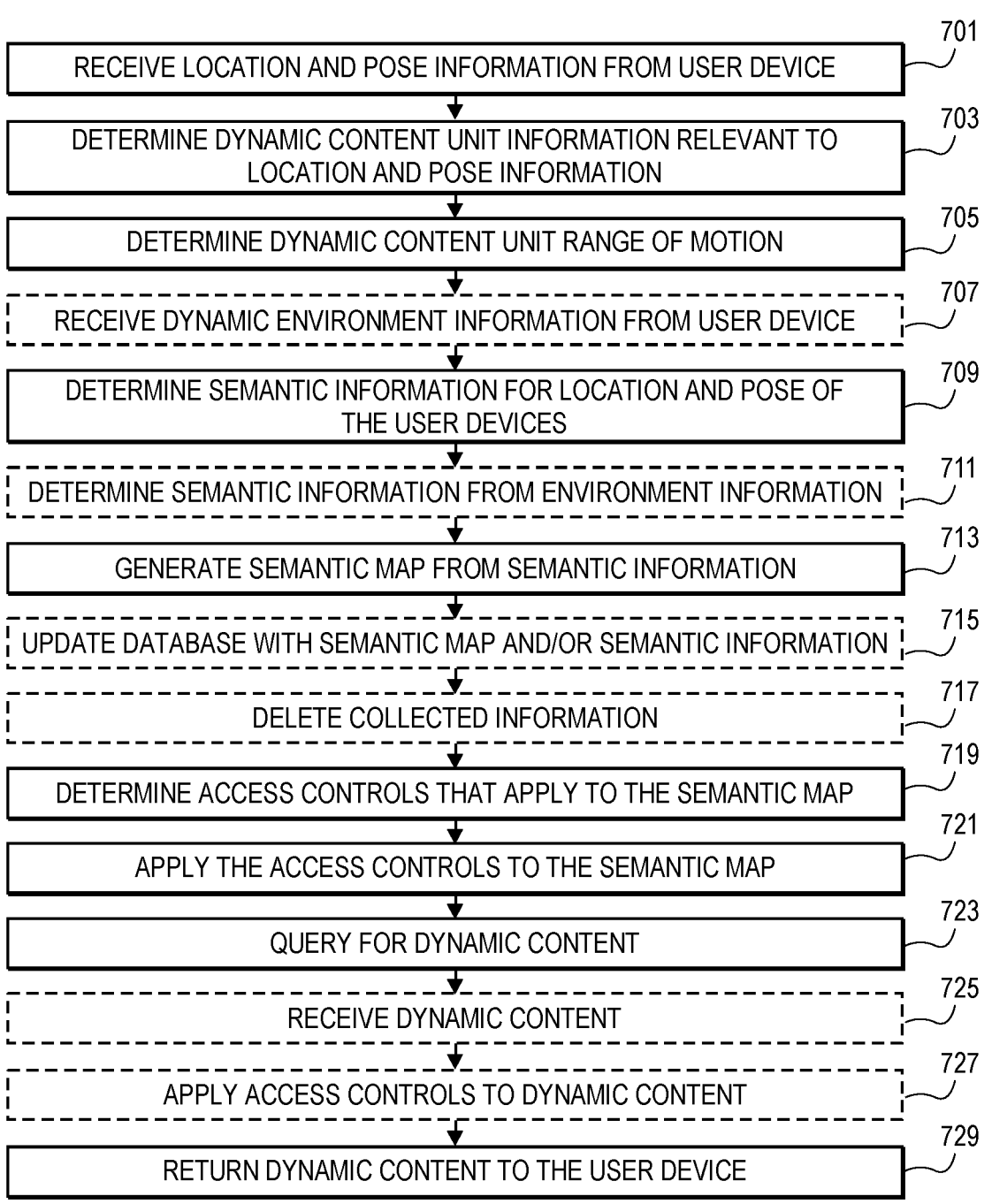

RECEIVE LOCATION AND POSE INFORMATION FROM USER DEVICE    701

DETERMINE DYNAMIC CONTENT UNIT INFORMATION RELEVANT TO LOCATION AND POSE INFORMATION    703

DETERMINE DYNAMIC CONTENT UNIT RANGE OF MOTION    705

RECEIVE DYNAMIC ENVIRONMENT INFORMATION FROM USER DEVICE    707

DETERMINE SEMANTIC INFORMATION FOR LOCATION AND POSE OF THE USER DEVICES    709

DETERMINE SEMANTIC INFORMATION FROM ENVIRONMENT INFORMATION    711

GENERATE SEMANTIC MAP FROM SEMANTIC INFORMATION    713

UPDATE DATABASE WITH SEMANTIC MAP AND/OR SEMANTIC INFORMATION    715

DELETE COLLECTED INFORMATION    717

DETERMINE ACCESS CONTROLS THAT APPLY TO THE SEMANTIC MAP    719

APPLY THE ACCESS CONTROLS TO THE SEMANTIC MAP    721

QUERY FOR DYNAMIC CONTENT    723

RECEIVE DYNAMIC CONTENT    725

APPLY ACCESS CONTROLS TO DYNAMIC CONTENT    727

RETURN DYNAMIC CONTENT TO THE USER DEVICE    729

PHYSICAL DEVICES AND PHYSICAL CONNECTIVITY

SPECIAL PURPOSE HARDWARE

NETWORK FUNCTION VIRTUALIZATION (NFV)

SPECIAL PURPOSE NETWORK DEVICE 1102

GENERAL PURPOSE (COTS) NETWORK DEVICE 1104

HYBRID NETWORK DEVICE 1106

VIRTUAL NETWORK ELEMENT(S)
1130A ••• 1130R

ND CONTROL PLANE 1124

1122

NETWORKING SOFTWARE INSTANCE(S)

CONTROL COMMUNICATION AND CONFIG. MOD. 1132A

1132R

FORWARDING TABLE(S) 1134A

1134R

PROCESSORS 1112

FORWARDING RESOURCE(S) 1114

PHYSICAL NIS 1116

1110

NETWORKING HARDWARE

NON-TRANSITORY MACHINE READABLE STORAGE MEDIA 1118

NETWORKING SOFTWARE 1120

DYNAMIC CONTENT UNIT SERVICES 1165

ND FORWARDING PLANE 1126

VIRTUAL NETWORK ELEMENT(S)
1160A ••• 1160R

1162A

1162R

APP(S) 1164A

APP(S) 1164R

SOFTWARE INSTANCE(S)

VIRTUALIZATION LAYER 1154

1152

PROCESSOR(S) 1142

PHYSICAL NIS 1146

1140

HARDWARE

NON-TRANSITORY MACHINE READABLE STORAGE MEDIA 1148

SOFTWARE 1150

DYNAMIC CONTENT UNIT SERVICES 1165

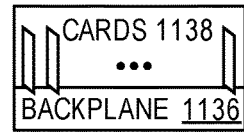

CARDS 1138
•••
BACKPLANE 1136

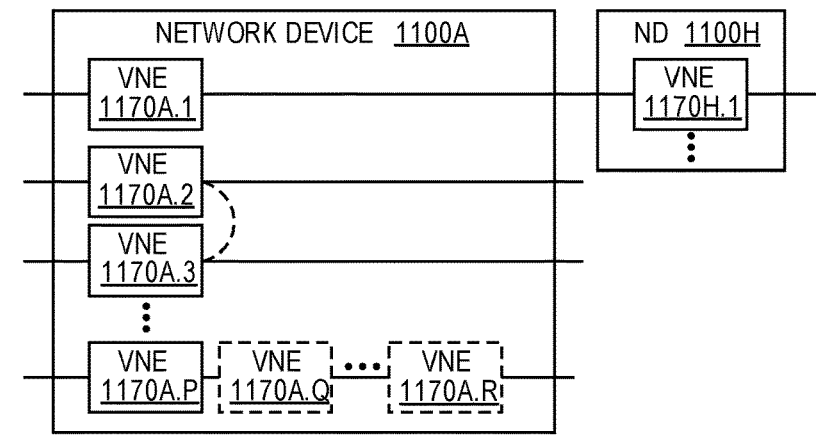

NETWORK DEVICE 1100A

VNE 1170A.1

VNE 1170A.2

VNE 1170A.3

VNE 1170A.P     VNE 1170A.Q  ....  VNE 1170A.R

ND 1100H

VNE 1170H.1

FIG. 11D

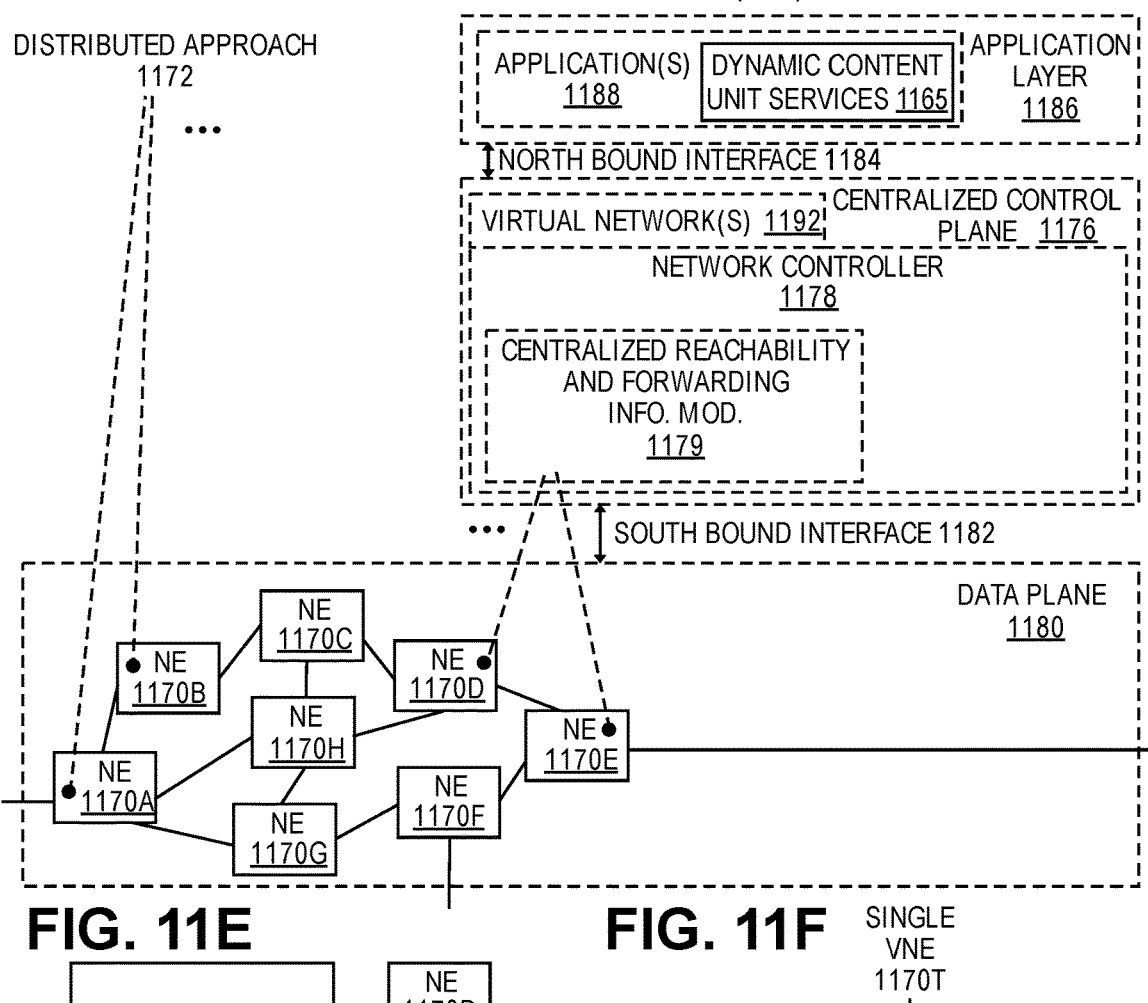

CENTRALIZED APPROACH (SDN) 1174

DISTRIBUTED APPROACH 1172

APPLICATION(S) 1188    DYNAMIC CONTENT UNIT SERVICES 1165    APPLICATION LAYER 1186

NORTH BOUND INTERFACE 1184

VIRTUAL NETWORK(S) 1192    CENTRALIZED CONTROL PLANE 1176

NETWORK CONTROLLER 1178

CENTRALIZED REACHABILITY AND FORWARDING INFO. MOD. 1179

SOUTH BOUND INTERFACE 1182

DATA PLANE 1180

SINGLE VNE 1170T

ND 1100A
VNE 1170A.1

ND 1100H
VNE 1170H.1

MOVING MEDIA IN EXTENDED REALITY

CROSS-REFERENCE TO RELATED APPLICATIONS

This application is a National stage of International Application No. PCT/IB2021/052054, filed Mar. 11, 2021, which is hereby incorporated by reference.

TECHNICAL FIELD

Embodiments of the invention relate to the field of extended reality; and more specifically, to support for moving dynamic content in extended reality and the restriction of dynamic content in extended reality.

BACKGROUND ART

Augmented reality (AR) augments the real world and the physical objects in the real world by overlaying virtual content. This virtual content is often produced digitally and may incorporate sound, graphics, and video. For example, a shopper wearing augmented reality glasses while shopping in a supermarket might see nutritional information for each object as they place it in their shopping cart. The glasses augment reality with information.

Virtual reality (VR) uses digital technology to create an entirely simulated environment. Unlike AR, which augments reality, VR immerses users inside an entirely simulated experience. In a fully VR experience, all visuals and sounds are produced digitally and do not include input from the user's actual physical environment. For example, VR may be integrated into manufacturing where trainees practice building machinery in a virtual reality before starting on the real production line.

Mixed reality (MR) combines elements of both AR and VR. In the same vein as AR, MR environments overlay digital effects on top of the user's physical environment. MR also integrates additional, richer information about the user's physical environment such as depth, dimensionality, and surface textures. In MR environments, the end user experience more closely resembles the real world. As an example, consider two users hitting a MR tennis ball on a real-world tennis court. MR incorporates information about the hardness of the surface (grass versus clay), the direction and force the racket struck the ball, and the players' height. Augmented reality and mixed reality are often used to refer to the same idea. As used herein, "augmented reality" also refers to mixed reality.

Extended reality (XR) is an umbrella term referring to all real-and-virtual combined environments, such as AR, VR and MR. XR refers to a wide variety and vast number of levels in the reality-virtuality continuum of the perceived environment, consolidating AR, VR, MR and other types of environments (e.g., augmented virtuality, mediated reality, etc.) under one term.

An XR user device is the device used as an interface for the user to perceive both virtual and/or real content in the context of extended reality. Example embodiments of XR user devices are described herein in reference to FIGS. 5, 6, and 8-10 as devices (501, 810A-C, 900, and 1100A-F). An XR user device typically has a display that may be opaque and displays both the environment (real or virtual) and virtual content together (i.e., video see-through) or overlay virtual content through a semi-transparent display (optical see-through). The XR user device may acquire information about the environment through the use of sensors (typically cameras and inertial sensors) to map the environment while simultaneously tracking the device's location within the environment.

Object recognition in extended reality is mostly used to detect real world objects and for triggering the display of digital content. For example, a consumer can look at a fashion magazine with augmented reality glasses and a video of a catwalk event would play instantly. Sound, smell, and touch are also considered objects subject to object recognition. For example, a diaper advertisement could be displayed when a sound or mood of a crying baby is detected. Mood could be deduced from machine learning applied to the sound data.

SUMMARY

In one embodiment, a method of a system of one or more electronic devices supports an extended reality application at a user device. The method includes receiving, from the user device, location and pose information of the user device related to an extended reality environment of the extended reality application, determining at least one dynamic content unit, in the extended reality environment, relevant to the location and pose information of the user device, determining a range of motion of the at least one dynamic content unit, wherein the at least one dynamic content unit moves through the extended reality environment; determining semantic information for the location and pose of the user device, generating a semantic map from the semantic information, determining at least one access control that applies to the semantic map, applying the at least one access control to the semantic map to prevent display of dynamic content on the dynamic content unit at a location in the semantic map, querying a dynamic content manager for dynamic content to be displayed as an extended reality overlay, and returning the dynamic content to the user device.

In another embodiment, a system of one or more electronic devices supports an extended reality application at a user device. The system includes a non-transitory machine-readable medium having stored therein dynamic content unit services, and a processor coupled to the non-transitory machine-readable storage medium. The processor executes the dynamic content unit services. The dynamic content unit services receive, from the user device, location and pose information of the user device related to an extended reality environment of the extended reality application, determine at least one dynamic content unit, in the extended reality environment, relevant to the location and pose information of the user device, determine a range of motion of the at least one dynamic content unit, wherein the at least one dynamic content unit moves through the extended reality environment, determine semantic information for the location and pose of the user device, generate a semantic map from the semantic information, determine at least one access control that applies to the semantic map, apply the at least one access control to the semantic map to prevent display of dynamic content on the dynamic content unit at a location in the semantic map, query a dynamic content manager for dynamic content to be displayed as an extended reality overlay, and return the dynamic content to the user device.

In a further embodiment, a non-transitory machine-readable medium having stored therein a set of instructions, which when executed by an electronic device cause the electronic device to perform a set of operations. The operations include receiving, from a user device, location and pose information of the user device related to an extended reality environment of the extended reality application, determining at least one dynamic content unit, in the extended reality environment, relevant to the location and pose information of the user device, determining a range of motion of the at least one dynamic content unit, wherein the at least one dynamic content unit moves through the extended reality environment, determining semantic information for the location and pose of the user device, generating a semantic map from the semantic information, determining at least one access control that applies to the semantic map, applying the at least one access control to the semantic map to prevent display of dynamic content on the dynamic content unit at a location in the semantic map, querying a dynamic content manager for dynamic content to be displayed as an extended reality overlay, and returning the dynamic content to the user device.

BRIEF DESCRIPTION OF THE DRAWINGS

The invention may best be understood by referring to the following description and accompanying drawings that are used to illustrate embodiments of the invention. In the drawings:

FIG. 1 is a diagram of one example embodiment of a vehicle displaying static and dynamic content via extended reality (XR) overlays.

FIG. 7 is a flowchart of one embodiment of a process of a set of electronic devices in the edgecloud that implements dynamic content unit services.

FIG. 11A illustrates connectivity between network devices (NDs) within an exemplary network, as well as three exemplary implementations of the NDs, according to some embodiments of the invention.

FIG. 11B illustrates an exemplary way to implement a special-purpose network device according to some embodiments of the invention.

FIG. 11C illustrates various exemplary ways in which virtual network elements (VNEs) may be coupled according to some embodiments of the invention.

FIG. 11D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 11E illustrates the simple case of where each of the NDs implements a single NE, but a centralized control plane has abstracted multiple of the NEs in different NDs into (to represent) a single NE in one of the virtual network(s), according to some embodiments of the invention.

FIG. 11F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 2:
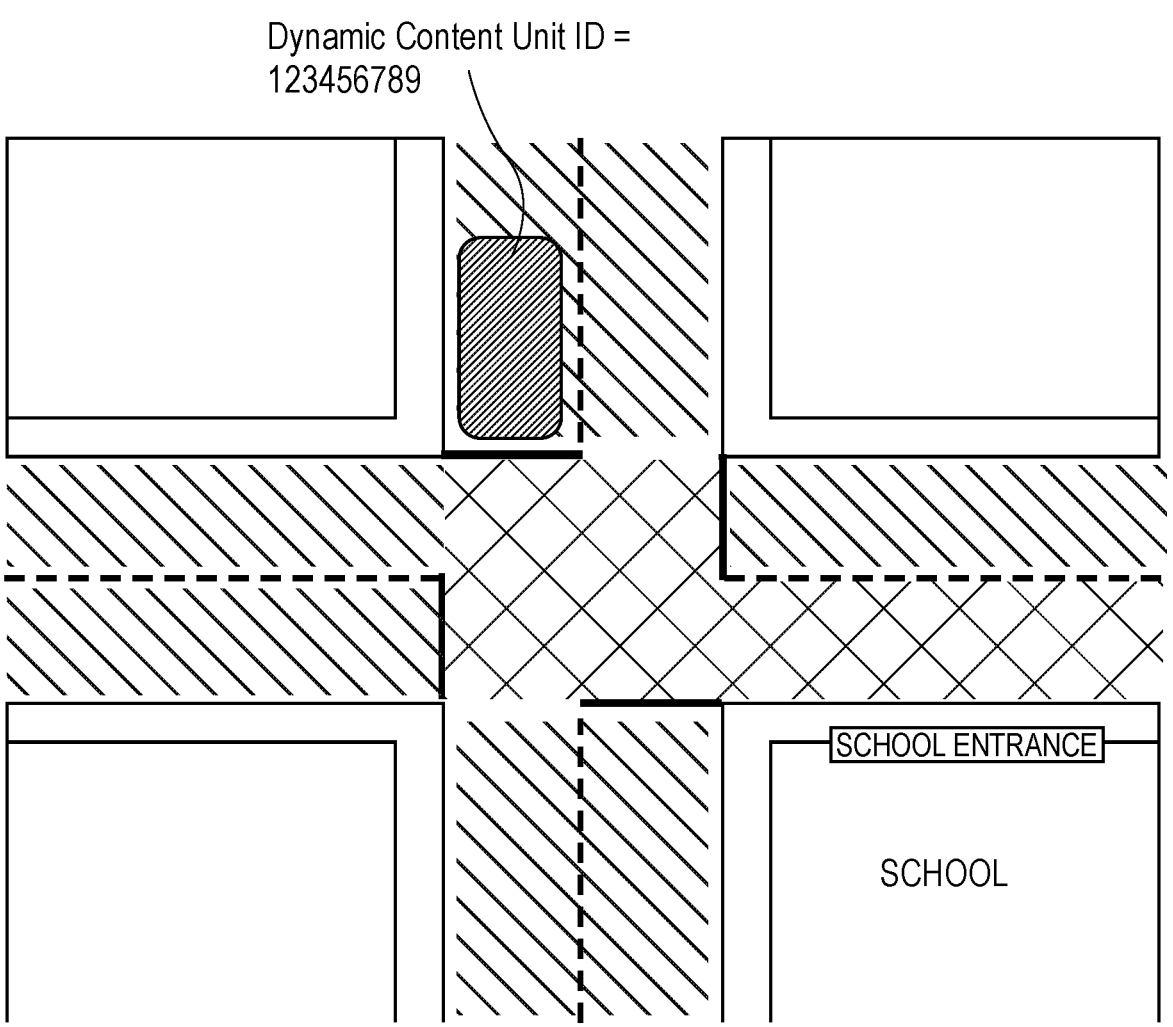
FIG. 2 is a diagram of one example embodiment of a range of movement for an dynamic content unit.

The following description describes methods and apparatus for managing dynamic content units including support for managing the movement of the dynamic content units and display of dynamic content. The embodiments provide dynamic content units that can be defined by their geometric size in three dimensions (height, width, and depth) as well as their range of motion, altitude, and similar characteristics. The dynamic content units can also be dynamically defined by their projected size in two dimensions as they move. The embodiments also provide real time semantic understanding using visual, audio, sensor, or any other data type for purposes of incorporating dynamic content for dynamic content units that can move. The embodiments enable static and dynamic blocking or allowing via access controls of dynamic content such that the dynamic content will cease to display when moving into an access controlled geospatial area.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments provide management of dynamic content for extended dynamic content units in extended reality environments. The dynamic content units can be units that have a location in the extended reality environment, such that content, referred to herein as dynamic content, associated with dynamic content unit is displayed or similarly represented in the extended reality environment. Dynamic content units contain information about the size and kind of dynamic content that is associated with the dynamic content unit. The dynamic content can be any type of sensory or related information (e.g., graphics, sounds, and similar information). In some cases, the dynamic content can be an advertisement. The dynamic content units define the location and dimensions where the dynamic content can be displayed in the extended reality environment. The dynamic content units and the dynamic content can be two or three dimensional, and have perspective, i.e., determining whether the dynamic content is visible from all directions in a given physical environment. Dynamic content unit locations can be defined and associated with a given physical location where that location is spatially mapped (e.g., the interior, exterior, or both) to identify possible locations of the dynamic content units. Any number of dynamic content units can be defined for a given location and associated with specific space or objects at the location. For instance, a surface that is 5 meters by 5 meters can be subdivided into multiple dynamic content units of varying dimensions. The display of the dynamic content in a user device (such as an XR user device) is referred to as an XR overlay. The XR overlay is a rendering based on the perspective (e.g., within a scene, virtual environment, physical location, or the like) of the XR user device (e.g., as displayed to, or viewed by, a user of the XR user device) that shows any aspect or information derived from the dynamic content (e.g., the rendering of an graphic, playing of audio or video, haptic feedback, or similar output from the XR user device).

Object recognition in the extended reality environment can be used to detect real world objects for triggering the display of the dynamic content. For example, a user can look at a fashion magazine with augmented reality glasses and a video of a catwalk event would play in a video in response to recognizing the magazine. Sound, smell and touch are also considered objects subject to object recognition. For example, a diaper ad can be displayed in response to the sound and the mood of a crying baby being detected. Mood can be deduced from analysis (e.g., machine learning) of sound data.

In some embodiments, real time bidding (RTB) is utilized for determining the dynamic content that is displayed or associated with a dynamic content unit. The RTB can be a fully automated process that allows inventory to be bought and sold. In RTB, inventory is sold per impression and priced via auction. These auctions determine who wins the right to place dynamic content (e.g., an advertisement) in a given dynamic content unit at a given point in time, referred to as an opportunity. The winning bidder's dynamic content is then shown instantaneously. A Supply-Side Platform (SSP) is a technology that enables publishers to manage dynamic content (e.g., ad inventory) and receive revenue. A Demand-Side Platform (DSP) is a system that offers demand management to buyers of dynamic content units (e.g., advertisers). DSPs helps buyers look for and buy inventory from the marketplace. Demand-side platforms can also be responsible for managing real-time bidding for buyers. DSPs can keep buyers informed by sending them updates about upcoming auctions.

A dynamic content server is a web server that stores dynamic content. After an RTB auction is won, the dynamic content server delivers the dynamic content to an application at the user device, the XR environment, or website. An impression, as used herein, is the assignment of dynamic content that has been downloaded from a dynamic content server and displayed via a user device for a given time period. As used herein, an audience is a list of people who share certain behavioral, psychographical, demographics, or other characteristics. An example of an audience can be impulsive shoppers with a net worth of $100K or above who live in California. An 'ad' is a type of dynamic content that can be a piece of audio/visual creative content designed to influence consumers' perceptions of brands or causes and/or cause them to engage in a set of calls to action.

The embodiments overcome the limitations of the prior art. XR has numerous technical and implementation challenges that have yet to be solved. Unlike other forms of digital content, which are generally displayed on electronic screens, XR overlays visual information into an end user's field of vision. Correctly displaying these XR overlays requires the integration of various understandings of the physical space into the digital content to be displayed in the extended reality environment. For instance, property owners, such as homeowners, office management companies, and public agencies must decide whether to allow dynamic content units in a given physical location. Without such a system, deployment of an extended reality environment could result in anyone being able to place content using dynamic content units in a physical location without any controls on quality, safety, property rights, and similar considerations.

The use of dynamic content units can be based on methods using artificial intelligence (AI) to automatically scan a real-world physical environment and divide it into optimal two- and/or three-dimensional dynamic content units. Dynamic content units can be defined and stored in an edge and/or cloud computing environment (hereinafter, "the edgecloud"), the system defines a given dynamic content unit using its global position (i.e., latitude, longitude, and altitude). Example embodiments of edgecloud are described herein in reference to FIGS. 5, 6, and 8-12 as devices (503, 860, 900, 1000, 1102, 1104, 1174, and 1204). This results in dynamic content units that cannot move around a physical environment. While physically static dynamic content units have utility, many envisaged dynamic content unit use cases require that content be able to move through space.

These mobile dynamic content units are defined such that they are able to move through space. Dynamic content units can address various use cases currently unsupported. The first is allowing dynamic content units to move through space. The embodiments operationalize movement of a mobile dynamic content unit through space in multiple ways including tracking the end user device movements such that the dynamic content is always an arbitrary distance from the end user device, and anchoring a mobile dynamic content unit to an object capable of moving, such as a train, bus, or car. Another use case is blocking all display of dynamic content via the dynamic content unit and/or disallowing different dynamic content as a mobile dynamic content unit moves through space. For example, cities may block all dynamic content unit based dynamic content within 50 meters of schools or playgrounds or block content with adult themes within their jurisdictional boundaries. The embodiments also introduce an architecture that allows the price of a dynamic content unit for displaying dynamic content to vary depending upon its range of motion.

FIG. 1 is a diagram of one example embodiment of a vehicle displaying static and dynamic content via extended reality (XR) overlays. The embodiments build on spatial mapping (the process of creating a three-dimensional map of a physical environment) and semantic understanding (understanding the meaning of objects and their relationships) to enable mobile dynamic content units. Dynamic content units can be defied by their location within the spatial map in three-dimensional space and the orientation of the dynamic content unit with respect to the map origin or inertial frame. This is then stored in the edgecloud and made available for display in XR by an XR user device. The embodiments use spatial mapping and semantic understanding to estimate the areas where a given dynamic content unit can travel (i.e., a range of motion). This range of motion is then stored in the edgecloud and made accessible for real-time bidding (RTB) and programmatic purposes where dynamic content can be selected for display via the dynamic content unit.

The difference between a dynamic and static dynamic content unit is illustrated in FIG. 1. In the top panel, a dynamic content unit is defined on the side of a bus. This is an example static dynamic content unit, where the location of the dynamic content unit is defined using latitude, longitude, and altitude. Any dynamic content assigned to the dynamic content unit can be placed in this location and can only be displayed in this location, therefore if the bus moves the static dynamic content unit will still remain there and not on the bus. By contrast, a mobile dynamic content unit is defined such that it can move through space. In the bottom panel, the dynamic content unit and any associated dynamic content can follow the bus as it moves or as the end user moves in relation to the bus.

Spatial mapping and semantic understanding are necessary to generate logical bounds for a given dynamic content unit's range of motion. Semantic understanding, which can use computer vision and artificial intelligence, refers to information about the meaning of each component contained within an environment, such as an object's class, location, weight and density. Spatial mapping refers to the process through which the three-dimensional environment is measured and represented digitally. These two techniques are used to impose logical bounds in the field of motion for dynamic content units. Allowing restrictions related to dynamic content units' movement provides options to support potential use of dynamic content in relation to real world considerations of advertisers, policymakers, or brands that may wish to prevent dynamic content or certain forms thereof from moving into designated locations.

After a physical real-world area is enrolled, e.g., a spatial map and semantic understanding (hereinafter referred to as the semantic map) are generated for the area the resulting data is stored in the edgecloud and associated with the metadata to describe XR dynamic content and overlays stored in supply-side platforms (SSP). While logical rules paired with semantic mapping can restrict the movement of a mobile dynamic content unit, the embodiments also introduce the concept of geospatial access controls. Access controls, as used herein, refer to settings/parameters/preferences, and/or corresponding actions related to, allowing or blocking/denying (e.g., preventing display of) specific dynamic content (e.g., from a given source of dynamic content, or of a certain type or class) or determining whether any content is allowed from a given source of dynamic content. The embodiments can include at least two new forms of access controls. The first, geospatial access controls, refers to controlling dynamic content display in either a set of predefined fixed or dynamic physical locations. Examples of geospatial access controls include preventing display in locations that can be described with a three-dimensional field, such as road intersections, schoolgrounds, or physical advertising. The second, object-based access controls, prevents dynamic content units or specific dynamic content from being overlaid on top of specific types of objects identified via object recognition. Examples of object-based access controls include preventing dynamic content units from being utilized on certain static objects such as physical infrastructure (e.g., traffic lights, pedestrians, vehicles, or animals). In some embodiments, types or classes of objects are defined based on one or more identifying characteristics of the object (e.g., any pedestrian) and/or arbitrarily (e.g., dynamic overlay is prohibited on one specific billboard, but no other billboards). In other words, and unless otherwise noted herein, any reference made to 'type' or 'class' of object does not necessarily require that all objects with similar characteristics are treated in the same manner with respect to dynamic overlay access controls.

FIG. 2 is a diagram of one example embodiment of a range of movement for a dynamic content unit. In the illustrated example, a bird's eye view of the hypothetical range of movement for a given dynamic content unit (Dynamic Content Unit ID=123456789) is shown. In this figure, the XR overlay for a dynamic content unit may be rendered on top of the striped (/) vehicle, when the vehicle is in areas with diagonal stripes (\) like roads, but not in areas that are crossed out (X) such as the intersection or close to school entrance. This set of access controls or permissions is stored in the metadata associated with the dynamic content unit ID in the edgecloud.

Spatial mapping is the process of creating a three-dimensional digital map of a physical environment. While spatial mapping can place objects in a three-dimensional field, it does not include any information about those objects or their meaning. This knowledge is obtained via semantic understanding, which integrates information such as the object's meaning or class, suitability for different uses, and capacity for movement about the objects in the environment. Placing that information about objects inside a spatial map is called semantic mapping. Semantic mapping is used to define the allowable range of motion for dynamic content units.

As mentioned, dynamic content units can be defined in three dimensions, height, width, depth (or similar dimensions), which applies to both static and mobile dynamic content units. Dynamic content units can also be defined in two dimensions (height, width) or have three-dimensional shapes. Dynamic content units can also be defined by their projected size, e.g., in $cm^2$, which will depend on the perspective and distance viewed by the observer i.e., the same dynamic content units will appear smaller from far away than from a close distance because it covers less space in the field of view. The projected size of the dynamic content unit and associated dynamic content can be calculated using projective geometry from the 3D space to the 2D view originated from the visual effect of perspective. This definition holds regardless of the display resolution of the device that observes the dynamic content unit.

Dynamic content units and associated XR overlays can also be defined by their rendered size, e.g., in pixels, which relates to the projected size, but also depends on the resolution of the XR user device since the resolution affects the number of pixels needed to display the XR overlay. The embodiments refer to the location where dynamic content unit and/or dynamic content begins displaying as the starting point. For static dynamic content units, the starting point is the same as the dynamic content unit's current location. However, mobile dynamic content units can move beyond its starting point. The range through which a mobile dynamic content unit may move is specified with the metadata associated with the dynamic content unit, e.g., in a supply-side platform (SSP).

The embodiments combine spatial mapping with semantic understanding to further refine a dynamic content unit's range of motion. In the static case, a dynamic content unit's range of motion is restricted, or dynamic content displayed thereon is prevented from being displayed, such that it does not travel through or near static locations or objects unsuitable for display of dynamic content, such as schools or government offices. As this class of objects do not move often, the semantic map is refreshed only as needed. The process for static access controls of objects is described in further herein below.

In the dynamic case, the embodiments can use 5G NR's (or similar architecture) speed latency to incorporate real-time spatial, audio, visual, sensor, and other data into the spatial mapping process. After either being registered or gathered by an XR user device, the data are uploaded into the edgecloud. Once in the edgecloud, semantic understanding algorithms are then applied to impose further logical bounds on the range of motion based upon those real-time data. Examples of dynamic logical bounds include preventing mobile dynamic content units from traveling through pedestrians and moving vehicles. The process for dynamic access controls of objects is described in further herein below. The metadata describing a mobile dynamic content unit can be stored in the edgecloud, supply-side platform (SSP), or similar location. The embodiments can utilize any number and variety of metadata fields. In some embodiments, the metadata fields include range of motion associated with a mobile dynamic content unit. For example, this can be measured in terms of cubic centimeters within a scene where a mobile dynamic content unit is allowed to travel. These ranges can be used for anticipating movement of the dynamic content unit, for real-time bidding (RTB) pricing, and similar uses.

FIG. 2 also provides an example context where geospatial and object-based access controls can be used to address multiple policy and technical issues related to dynamic content units simultaneously. Rendering dynamic content requires significant edgecloud computation resources, especially in dynamic situations. Simultaneously mapping the environment and performing object detection can be computationally demanding. XR content's large file sizes also impose a strain on mobile networks. Restricting dynamic content units to only places where it is desired reduces unnecessary compute usage and burden on mobile networks. Concordantly, this also diminishes dynamic content units' environmental impact. Second, policymakers and citizens alike may not want dynamic content units and associated dynamic content to be able to move without restrictions. While a method for people to opt into dynamic content, dynamic content units, and/or XR overlays can be utilized when enrolling their environment, this does not address whether dynamic content is allowed to traverse environments owned by third parties. The embodiments enable policymakers to impose global or localized restrictions on the semantic map and/or metadata associated with a given dynamic content unit or associated dynamic content, preventing unwanted display or movement of designated dynamic content units or dynamic content within any three-dimensional environment.

TABLE I

|  | Dynamic | Static |
|---|---|---|
| Geospatial | Access controls on at least one three-dimensional location, based on factors that change over time. Examples: Concerts, protests, events, opening hours | Access controls on at least one three-dimensional location, based on factors that do not (or rarely) change over time. Examples: Municipalities that forbid dynamic content units or dynamic content; corporate offices; secure facilities, potentially dangerous locations |
| Object | Access controls on at least one type of object, or the location where an object appears, based on factors that change over time. Examples: Pedestrians, vehicles, animals | Access controls at least one type of object, or the location where an object appeared, based on factors that do not (or rarely) change over time. Examples: Traffic lights, pedestrian crossings, road signs |

Table I provides an overview of the differences between geospatial and object-based access controls. The embodiments provide a system that can be used for access controls on dynamic content units and dynamic content that is applicable for any reasons any individual or policymaker may wish to manage a given object or geospatial area with relation dynamic content units and dynamic content. The embodiments operate on identifying a static geospatial unit to be defined in terms of global location (e.g., altitude, longitude, and latitude) prior to being subject to access controls. Similarly, static objects that are to be subject to access controls must be detectable via object detection technologies. Dynamic geospatial or object-based access controls work on the principles that given locations or objects are detectable and trackable via processing in the edgecloud.

Static access controls refer to blocking dynamic content units and dynamic content from appearing within a three-dimensional field or being overlaid on top of predefined objects in all cases. However, there are circumstances where it may be desired to prevent the dynamic content from appearing next to dynamically occurring scenes or objects in the environment. For example, an advertiser may want their dynamic content to appear in a town square, but not when that town square is being used for a concert or protest. Similarly, while advertisers may place their dynamic content on the side of a city bus, they may want to prevent it from being superimposed on top of pedestrians or other vehicles. This is referred to as dynamic access controls. In order to support dynamic access controls, XR user devices must be able to augment the extant semantic understanding of a scene with real-time sensor (e.g., visual, audio, range, and similar information) data. The embodiments can benefit from using 5G (new radio) NR's low latency and high speed, by utilizing the edgecloud-based architecture to augment semantic understanding in real-time for the purposes of dynamic content unit services and the dynamic content manager.

Figure 3:
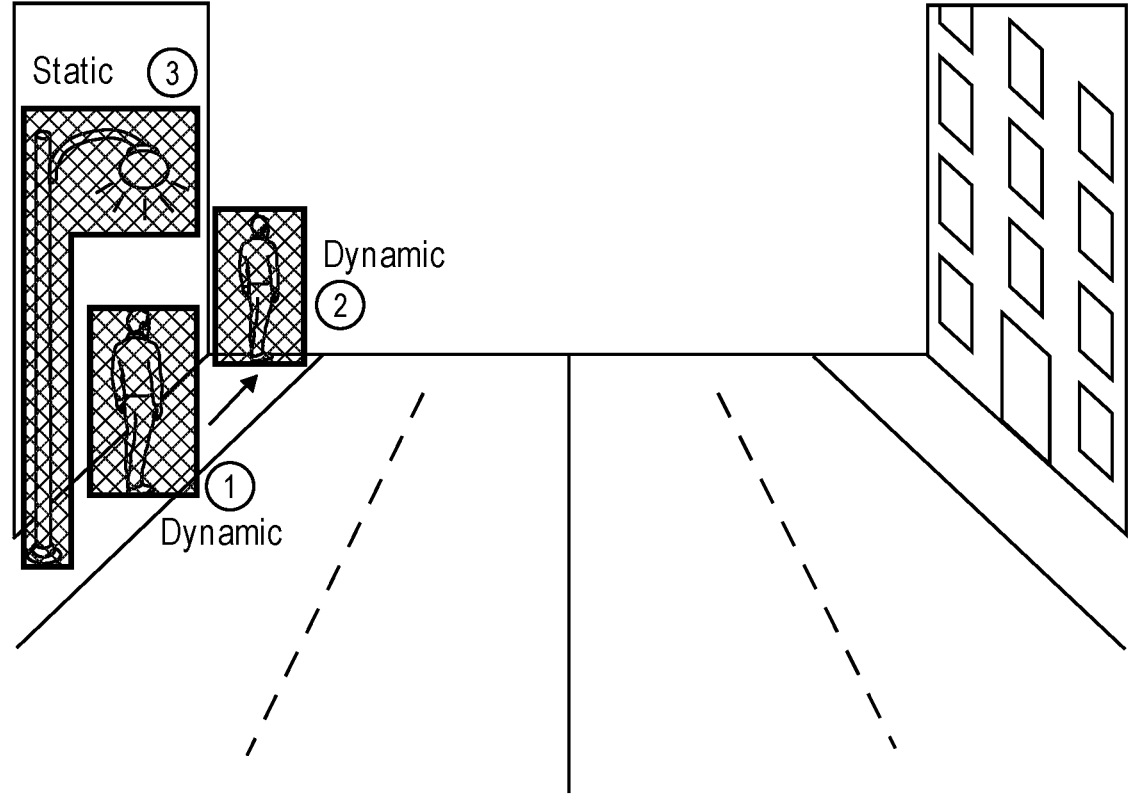
FIG. 3 is a diagram of one embodiment of dynamic content units that illustrates both static and dynamic access controls.

FIG. 3 is a diagram of one embodiment of dynamic content units that illustrates both static and dynamic access controls. The example illustrated is a street scene where mobile dynamic content units or the associated dynamic content have access controls that indicate they may not travel through or be superimposed on top of pedestrians as they move through a space.

The scene includes a static access-controlled object (3) that is a lamppost. While it may be relocated periodically, it does not do so with great regularity. Static access-controlled areas do not require real time processing in the edgecloud. As mentioned, static access control is used to prevent mobile dynamic content units from displaying near objects that rarely move around an environment. Examples of such objects include physical locations such as buildings and parks; physical infrastructure such as lampposts or crosswalks; and attractions such as sculptures and fountains. The objects or location can be access controlled for any reason, e.g., advertisers may choose not to allow their content to be displayed in a particular location, or government policy may prevent the display of XR content in certain locations. This includes geospatial and object access control.

The first step of the application of access controls can be to enroll, register, or similarly log information about a physical environment using spatial mapping and object detection. After being registered by a XR user device (e.g., a headset), the resulting data are uploaded into the edgecloud (e.g., via 5G NR and/or Wi-Fi). The information sent to the edgecloud could be either raw data (visual, audio, sensor, and other information), processed data (e.g., features, keyframes, pose, detections, or similar information) or even local or partial maps (pointclouds or meshes), depending on the device capabilities and network conditions.

Once in the edgecloud, spatial mapping is used to recognize the geometry of the environment to build a 3D model of the scene and measure the size and shape of elements in the environment in three-dimensions. This results in a three-dimensional spatial map. Semantic understanding is used to localize and classify the objects within the scene and categorize them.

These data are then stored within at the edgecloud, at a supply-side platform (SSP), or in a similar location. The embodiments support use cases where users, e.g., advertisers, bid on dynamic content units via real time bidding (RTB), programmatic advertising, or similar techniques. These bids can be scored based on the number of access controlled objects included in a particular mobile dynamic content unit's range of motion, or on similar criteria or combinations thereof.

This scene, in FIG. 3, also includes an example of dynamic access controls, because the access control area moves with the pedestrian. The area initially subject to access controls when the pedestrian is at point (1) at time 1 is no longer subject to access controls when the pedestrian is located at point (2) at time 2. No dynamic content is allowed to be displayed within the areas indicated with cross-hatching. This can be implemented using geospatial and object access controls. Dynamic access controls are used to prevent mobile dynamic content units from displaying near certain types of objects that frequently move around in an environment. Examples of such objects include pedestrians, motor vehicles, and animals. Any object can be associated with access controls for any reason.

The overall process for dynamic access controls are similar to static access controls. In addition to the spatial map and object detection process described with relation to static access controls, dynamic access controls leverage XR user devices continuously streaming data, either raw (audio, visual, sensor, and other data) or processed (features, pose, keyframes, pointclouds, or similar data) into the edgecloud for processing. These data are used to update the three-dimensional spatial map in real time about whether a mobile dynamic content unit is allowed to move and whether the associated dynamic content can be displayed in the new locations.

The resulting real-time spatial map is then shared by the edgecloud with a supply-side platform (SSP) or similar entities. The embodiments enable user (e.g., advertisers) to bid on mobile dynamic content units for the display of their selected dynamic content via real-time bidding (RTB) and other forms of programmatic advertising. Enabling dynamic access controls prevents dynamic content from appearing in real-time in the wrong locations as determined by the dynamic access controls.

Figure 4:
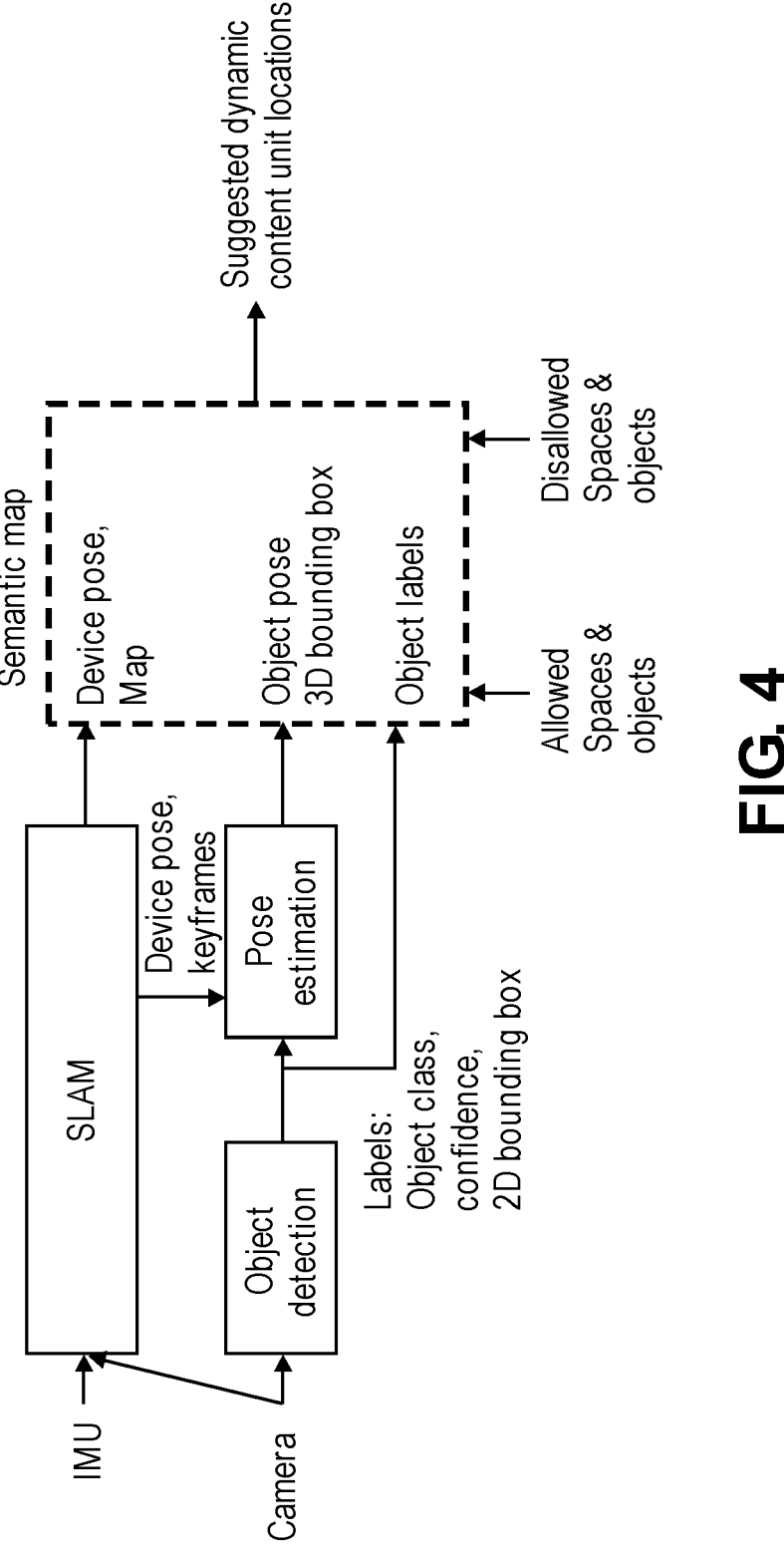
FIG. 4 is a flowchart of one embodiment of a process of an electronic device in the edgecloud that implements mobile dynamic content unit services.
Figure 5:
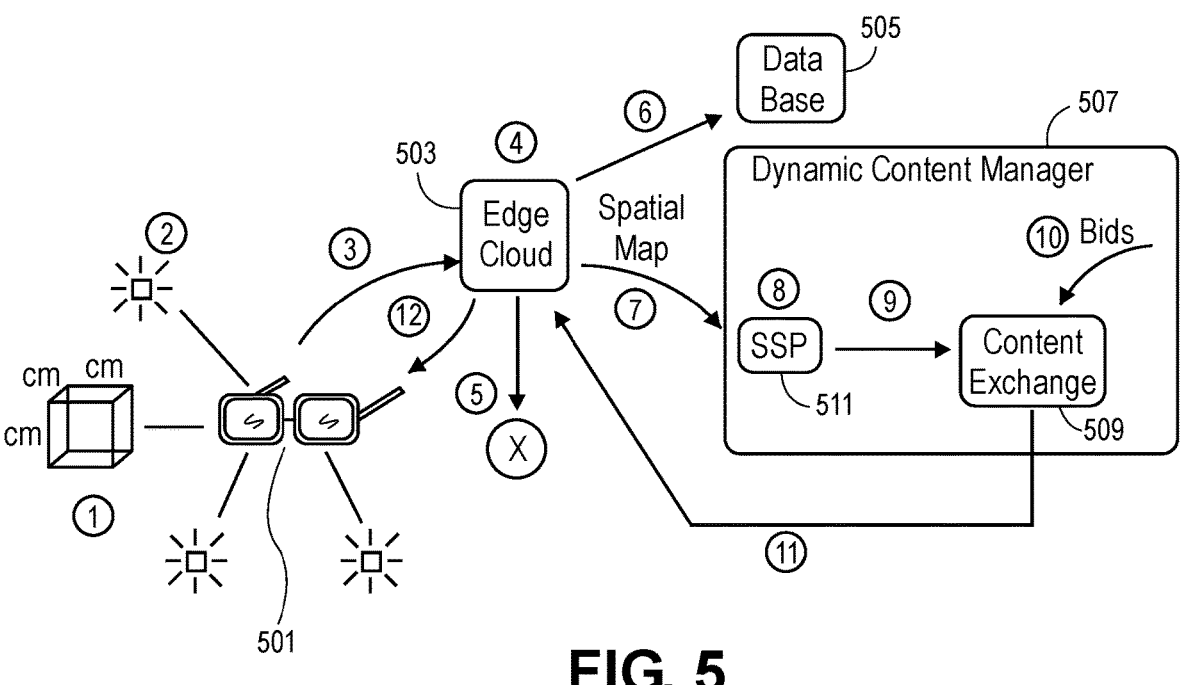
FIG. 5 is a diagram of one embodiment of the architecture of the edgecloud based dynamic content unit service.
Figure 6:
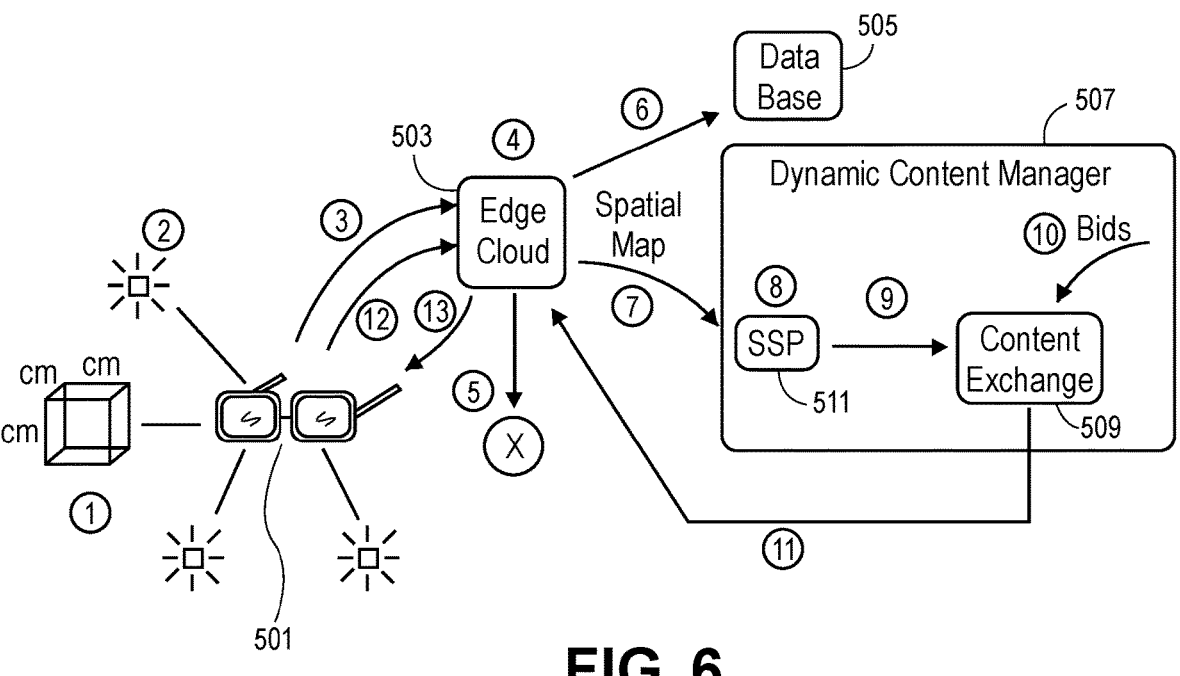
FIG. 6 is a diagram of another embodiment of the architecture of the edgecloud based mobile dynamic content unit service.

FIGS. 4-6 are diagrams of aspects of the architecture of the edgecloud and related components for supporting dynamic content unit services. The embodiments provide an architecture that has many advantages including speed, scalability, flexibility, context, and dimensionality. Speed is improved in the architecture using 5G, edge computing, and cloud computing that allow the spatial mapping process to complete far faster than current solutions. The architecture is scalable since it is cloud- and edge-ready. The architecture is flexible since the identification of dynamic content units can be done using any type of device. By incorporating semantic information into spatial mapping, the architecture of the embodiments enables users to automatically block and/or allow creation of dynamic content units on predetermined surfaces. By incorporating all three dimensions (height, width, and depth) into the definition of dynamic content units, the embodiments provide a better match for characterizing physical space.

FIG. 4 is a flowchart of one embodiment of a process of an electronic device in the edgecloud that implements mobile dynamic content unit services. The flowchart shows the relationship of the functions and inputs that create a semantic map and produce locations for dynamic content units. Dynamic content units exist within a virtual representation of the environment called a spatial map. Spatial mapping allows the process to scan and map the real environment and use this virtual representation to place three-dimensional dynamic content units within it. This is done through computational geometry and computer vision using sensors present in the XR user device (e.g., typically cameras and inertial sensors) to map the environment while simultaneously keeping track of the XR user device's location within it. With a map of the environment and data on the XR user device's pose (i.e., location and orientation), the process can derive possible locations, sizes, and placements for dynamic content units in the environment.

Identifying optimal spaces and surfaces where dynamic content units and the associated dynamic content could be projected is insufficient for understanding possible dynamic content unit placement locations. Surface data does not have semantic meaning or interpretation associated with it. Purely geometric spatial mapping approaches are unable to recommend which surfaces are viable for dynamic content unit placement. Spatial mapping that can infer a scene's semantics and context and incorporate information about the class and semantics of objects within the map is performed. For example, there can be to two flat, octagonal surfaces of equal dimension. One octagon is a blank poster board placed inside a supermarket, while the other is a stop sign at a traffic intersection. As current spatial mapping techniques do not incorporate semantic and contextual information, they would identify both surfaces as possible dynamic content unit locations. While the blank poster board might be ideal for dynamic content unit placement, placing a dynamic content unit over a traffic sign is potentially hazardous. The embodiments incorporate contextual information from nearby objects in the environment to solve this problem.

The above example helps illustrate how dynamic changes within a scene are permanent or temporary anomalies. Just as information about the mapped environment can improve object detection, a dynamic process that measures changes in the orientation and/or pose of objects within the scene improves detection accuracy. Moreover, classifying objects within the spatial map allows for the automatic inclusion and/or exclusion of specific object spaces or surfaces from the dynamic content unit location identification process. There are numerous surfaces or spaces that are inappropriate for dynamic content units. For example, it is inappropriate and dangerous to create dynamic content units over human faces, traffic signs, and physical infrastructure such as roads, sidewalks, and pedestrian crossings. Incorporating semantic information into the spatial map allows the dynamic content unit creation process to follow a consistent set of rules around automatic inclusion and/or exclusion of various surfaces.

Combining object detection (semantics) and spatial mapping (geometry) together, is part of the practical use of the embodiments with regard to the automatic creation and placement of dynamic content units. The combination of the semantics with the spatial maps is referred to as semantic maps, which are spatial maps with embedded semantic information. As illustrated in FIG. 4, Spatial mapping can be performed through different mapping algorithms, e.g., using simultaneous localization and mapping (SLAM) frameworks. While a neural network (e.g., CNN), as an object detection model, can be used to provide semantic information of identified objects in the map, such as class, confidence and bounding box. The 3D pose of the object can be estimated directly from the depth data (if available) or using existing pose estimation models with the device pose and the key frames as an output from the SLAM.

The process of generating the semantic map includes obtaining the geometry of the environment detected by a user device. The geometry of the environment can be obtained by performing spatial mapping from sensor data using e.g., simultaneous localization and mapping (SLAM), structure from motion (SfM) or other 3D reconstruction algorithms on inertial measurement unit (IMU) input or similar sensor data. SLAM can be utilized by XR applications, spatial mapping can be performed in the XR user device or in the cloud, e.g., offline in a cloud service or real-time using edge-cloud infrastructure. The process further obtains semantics of the environment. The process performs object detection using e.g., convolutional neural networks (CNNs), and estimates the 3D position of the detected objects, directly using depth data (e.g., from a camera or similar sensors) or using pose estimation from the keyframes and device pose from the SLAM process.

From the geometry and semantics that have been determined, the process constructs the semantic map (e.g., a spatial map with embedded object identities). From the semantic map, the process identifies objects of interest in the environment. This can involve a lookup based on class of the objects to the database of object constraints and velocities. From this set of objects of interest, the initial/current conditions of identified objects, such as orientation, pose, speed and movement direction is determined. The process further looks for movement constraints of identified objects based on the class of the object (e.g., with determination of expected velocity and movement constraints from the lookup in the database of objects constraints and velocities). The class information can be determined by a lookup in a database of objects maintained at the edgecloud. With this set of information determined constraints for relevant objects can be determined. For example, a car cannot move laterally, but can move front and back, a person can move in all directions, both a car and a person are floor-bounded and are unlikely to move vertically.

Based on identified obstacles and bounding surfaces, the process further identifies spaces on the spatial map that the object is free to move to ($C_{free}$) and spaces that the object cannot move to ($C_{obstacle}$). This identifies the spaces where the objects' geometry collides with the environment geometry. The process sets a grid resolution based on the expected velocity and the expected computational frequency. The faster the objects move, the faster the computational frequency that is needed for maintaining good accuracy on movement prediction. The grid resolution is input to define a grid for the grid-based search. The process performs a grid-based search over $C_{free}$ to identify potential paths. At each grid point, the object is allowed to move to adjacent grid points as long as the line between them is completely contained within $C_{free}$. An exhaustive grid-based search would construct a complete road map of possible locations. There is no need for a full road map to be built. The process can be optimized to use starting point information, like initial conditions (speed and direction) and a traversal of a few successive grid points would be sufficient to complete the grid-based search. Other motion planning algorithms could be performed instead of grid-based search, like sampling-based algorithms, fuzzy algorithms, artificial potential fields, and similar motion planning algorithms to explore $C_{free}$ for potential paths.

Based on the identified initial conditions and constraints, the process constructs a probability field around the current state of the identified object. Depending on the desired/available framerate for calculations. Points on the probability field will be a value between 0 and 1 describing the likelihood of an object to move to a certain position based on the current position, orientation, movement direction and speed, taking into account the movement constrains. The probability field is constructed from all possible movement grid spaces obtained in the grid-based search (or similar search) with the origin of the search on the current point. The process assigns a value of 1 to all obtained movement directions in $C_{free}$ and 0 to the rest of the grid. The process multiplies by the object movement constraints value in all immediate directions (e.g., zero for constrained directions and 1 for allowed directions). The movement constraints can be obtained from the database of objects constraints and velocities. Based on the current orientation, direction and speed, the process multiplies by an angular adjustment value in the direction of travel "ang_adj=max (1−a*sin(abs(theta/2)),0)", where theta is the deviation from the travel direction and "a" is a constant between 0 and infinite. An angular adjustment value of zero will allow unrestricted change of direction, a large angular adjustment value will only allow a continuation towards the current direction of travel. The speed of the object is multiplied by a decay value [0-1] times the grid distance to predict the current position. The larger the value, the slower the decay with the distance. Decay values can be specified by any mechanism or property of the object. For example, different classes or categories of objects can be associated with different decay values. The result of these modifications is a D-MPF or similar semantic map that can be stored at the edgecloud and returned to an XR application or XR user device.

Further, the semantic map can have allowed and disallowed objects, spaces, areas, and similar access controls applied. These access controls function as a filter on the objects, spaces, areas, and similar entities that are eligible for being utilized for dynamic content units or dynamic content, or can indicate where dynamic content units or dynamic content can travel within the XR environment.

Blocking of mobile dynamic content units via access controls can be done manually or automatically. Manual geospatial access controls can be done by administrator, who are able to mark or segment different points in the XR environment to define geometric areas or volumes in the environment in order to block the creation of mobile dynamic content units in that specific space.

The implementing of access controls can be done in different ways including online and offline. Online access controls can be provided using an XR user device within the environment and using gestures or other tagging tools to tag points, surfaces or volumes to define the boundaries of a space within it. In the offline access control process, a 3D representation of the environment is used to mark boundaries of locations marked for blocking or similar access controls. For instance, custodians can visualize a 3D representation of the environment and mask locations for access controls. For this, a map of the environment is previously made available. The embodiments also include using visual, audio, sensor, or other data to subject specific objects or geospatial locations to access controls. This involves processing these data in the edgecloud and amending the spatial map stored at the edgecloud or within the supply-side platform (SSP).

FIG. 5 is a diagram of one embodiment of the architecture of the edgecloud based dynamic content unit service. The diagram shows the flow of video, audio, sensor, and other data from an XR user device 501 into the edgecloud 503. Once processed, these data are then shared into the dynamic content manager 507 ecosystem before content is returned to the XR glasses 501. This process is static because it does not incorporate real-time data. This is a network diagram and architecture for static access controls. The diagram shows the process from triggering a mobile dynamic content unit to receive bids and then display the winning dynamic content in the XR user device 501. This architecture is general and can be extended to incorporate additional processes, such as processing exclusively via the cloud and/or the edge or direct dynamic content buying. The first step (1) is the mobile dynamic content unit is activated for sale in the dynamic content manager. Any event or process can trigger the mobile dynamic content unit to be offered for sale.

In the second step (2), the XR user device 501 incorporates additional audio, visual, and sensor data to improve visualization of the XR dynamic content. In the third step (3), these data as well as information about the mobile dynamic content unit are uploaded from the XR user device 501 into the edgecloud 503 via 5G NR, WiFi or similar technology. The fourth step (4) is to process these data in the edgecloud for spatial mapping and semantic understanding. In an optional step (5), the raw data can be deleted after this processing to protect user privacy or to reduce data storage requirements. Step six (6) is for the result of the spatial mapping and semantic understanding (as well as the raw underlying data) to be stored in a database 505 that can be local to the edgecloud 503 or in a remote location. In step seven (7), the resulting spatial map with range of motion for the mobile dynamic content unit is shared with a supply-side platform (SSP) 511 or similar aspect of a dynamic content manager 507. In step 8, the spatial map is then associated with the SSP's metadata, such as dynamic content related access controls (e.g., brand- and advertiser-level access controls).

The ninth step (9) is for the SSP to sell its inventory of mobile dynamic content units in a content exchange 509. This inventory then receives bids (10) from entities that are interested in having their dynamic content displayed in the XR environment via the dynamic content units that they bid on. Any process or mechanism can be used to process and select bids that are made for the dynamic content units to display dynamic content. After a winning bid is selected, the XR user device 501 receives (step 12) the dynamic content and then displays the dynamic content in the mobile dynamic content unit (via step 11).

FIG. 6 is a diagram of another embodiment of the architecture of the edgecloud based mobile dynamic content unit service. This figure shows the flow of video, audio, sensor, and other data from an XR user device into the edgecloud. Once processed, these data are then shared into the dynamic content manager 507 ecosystem before dynamic content is returned to the XR user device 501. This process is dynamic because it incorporates real-time data from the XR user device 501 and returns it to the edgecloud 503 for processing and refinement of the spatial map.

The diagram shows the process from triggering the dynamic content to display in the XR user device. This architecture is general and can be extended to incorporate additional processes, such as processing exclusively via the cloud and/or the edge or direct dynamic content purchases. The architecture and processes are similar to the static process described above, but differs in that it allows for the incorporation of real-time data gathered from XR user devices 501. The first step (1) is the mobile dynamic content unit is activated for sale in programmatic advertising. This architecture able to be triggered by any event or process that the mobile dynamic content unit can then be offered for sale to display dynamic content.

In the second step (2), the XR user device incorporates additional audio, visual, and sensor data to improve visualization of the XR dynamic content. In the third step (3), these data as well as information about the mobile dynamic content unit are uploaded from the XR user device 501 into the edgecloud 503 via 5G NR and/or WiFi. The fourth step (4) is to process these data in the edgecloud 503 for spatial mapping and semantic understanding. In an optional step (5), the raw data can be deleted. Step six (6) is for the result of the spatial mapping and semantic understanding (as well as the raw underlying data) to be stored in a database 505. In step seven (7), the resulting spatial map with range of motion for the mobile dynamic content unit is shared with a supply-side platform (SSP) 511. In step 8, the spatial map is then associated with the SSP's metadata, such as user based access controls (e.g., brand- and advertiser-level access controls).

The ninth step (9) is for the SSP 511 to sell its inventory of mobile dynamic content units in a content exchange 509. This inventory then receives bids (10) from users (e.g., advertisers). The embodiments support any process through which bids are made for XR dynamic content. After a winning bid is selected, the XR user device 501 then displays dynamic content in the mobile dynamic content units (11). As the content is displayed, the XR user device 501 continuously records data and shares it into the edgecloud 503 (12) to continuously refine the spatial map, and receives correspondingly updated display content (13).

Once the spaces on the semantic spatial map have been designated as allowed or blocked via access controls (either beforehand or automatically during the mapping process). They are automatically identified as mobile dynamic content unit opportunities and standardized mobile dynamic content unit can be assigned to that specific space based on its dimensions. If during the mapping process, other blocked or allowed spaces are identified via access controls as potential spaces for hosting mobile dynamic content units, such spaces could also be identified as a mobile dynamic content unit. Depending on who owns the physical space, and if the owner allows mobile dynamic content unit placement on such space. Blocked spaces can be blocked automatically excluded for being considered overlay opportunities.

Once mobile dynamic content units have been identified within the map, they are automatically monitored for dynamic content placement. Dynamic content placement happens as a visual overlay or projection of virtual content over the projected physical space corresponding to the mobile dynamic content unit opportunity in the map. For that to happen, first mobile dynamic content unit should be mapped and sized where they will be projected initially, that is a starting location and orientation should be defined. A range of motion needs to be identified depending on the environment information from the spatial map. For example, a mobile dynamic content unit may travel in any direction, so long as it does not pass through physical infrastructure or other virtual content identified in the spatial map. And a velocity range should also be defined.

Static dynamic content units according to their geometric, projected or rendered size using different parametrization alternatives to define their size, location and orientation. For dynamic overlays, which have a range of motion, this definition will be used as the point of origin. Therefore, mobile dynamic content units can be represented as a volumetric object defined a nine-dimensional vector ($AU^G$) of three three-dimensional components: translational (t), rotational (r) and size (s). where "t" and "r" defines the starting point (location and orientation) of mobile dynamic content units. Moreover, dynamic overlays are also defined by a six-dimensional tensor ($AU^M$) describing the range of motion of the translational and rotational components of the range of motion, each component having a minimum and maximum bound. Moreover, a six-dimensional tensor ($AU^V$) describing the velocity range of the translational (v) and rotational (w) components, each component having a minimum and maximum bound. For static dynamic content units, the starting point is the same as the dynamic content unit's location and the range of motion vector is a unitary vector and the velocity component is zero. The size (s) component is composed by the Euclidean volumetric representation (W, H, D) of the object in cartesian coordinates in reference to the body frame. The translational (t) component describes the specific geographic location (latitude, longitude, altitude) or cartesian location (x, y, z) of the body frame origin in reference (e.g., center of mass) to the inertial frame. The orientation (o) component is defined by the specific orientation of the body frame with respect to the inertial frame ($\varphi$, $\theta$, $\psi$). The translational range of motion is denoted ($m_x$, $m_y$, $m_z$). The rotational range of motion is denoted ($m_\varphi$, $m_\theta$, $m_\psi$). The translational velocity range is denoted ($v_x$, $v_y$, $v_z$). Rotational velocity range is denoted ($w_\varphi$, $w_\theta$, $w_\psi$). Therefore, a mobile dynamic content unit can be represented as a nine-dimensional vector in the spatial map. Translation $t \in R^3$, orientation $o \in [0, 2\pi)^3$ and size $s \in R^3$.

$$AU^G = [x, y, z, \varphi, \theta, \psi, W, H, D]$$

$$AU^M = [m_x, m_y, m_z, m_\varphi, m_\theta, m_\psi]$$

$$AU^V=[v_x,v_y,v_z,w_\varphi,w_\theta,w_\psi]$$

A parametric definition of mobile dynamic content units in the spatial map can be used. The inertial frame origin (X, Y, Z) can be defined either at the geographic origin or at any other arbitrary origin of the map. The body frame origin (X''', Y''', Z''') can be defined at the center of mass of the dynamic content unit, where the dimensions (W, H, D) of the dynamic content unit starting point align with the frame axis, at a specific orientation ($\varphi$, $\theta$, $\psi$) located at a point (x, y, z) with respect to the inertial frame origin. There are multiple ways of optimizing the parametric representation of mobile dynamic content units that reduce vector dimensionality and apply assumptions or constrains when defining dynamic content units in the spatial map.

In one embodiment, dynamic content units can be parametrized such that mobile dynamic content units are defined in a globally consistent orientation reference (gravity). This can define dynamic content units parallel to walls or vertical surfaces to be seen from a standing up perspective. This is practical, since in most cases the dynamic content unit orientation will be constrained with the "bottom" plane pointing toward the gravity direction. This constraint allows reducing pose space to four dimensions instead of six. In other words, reducing the full spatial representation from nine to seven elements: Translation $t \in R^3$, rotation around gravity (yaw) $\psi \in [0, 2\pi)$ and size $s \in R^3$.

$$AU^G=[x,y,z,\psi,W,H,D]$$

The range of motion components can be parametrically constrained as follows:

$$AU^M=[m_x,m_y,m_z,m_\psi]$$

$$AU^V=[v_x,v_y,v_z,w_\psi]$$

In addition to the parametric representation of mobile dynamic content units ($AU^G$) containing information about the dynamic content unit location, orientation and size, dynamic content units can contain extra information about the type of content allowed in them. This meta-information can include: the type of media, e.g. still projections, video or interactive content; type of advertisement allowed, e.g., for different types of industries like gaming, fashion, consumer electronics, food, or similar types; target audiences, e.g., dynamic content targeted for specific audiences or general public; specific brands or users, e.g., any brand or user belonging to a particular industry, or just specific brand or users, e.g., brands owning the "location" of certain dynamic content units; and other type of metadata identifying the type of content that can be projected to the dynamic content unit in question. Metadata for dynamic content units can also be defined automatically using the just in time bidding process determining the audience type for specific dynamic content units using any method or process.

Building upon the motion probability field embodiments, the embodiments enable range of motion to be bounded by fixed obstacles in the end user's environment through which the dynamic content units and dynamic content cannot logically pass, as discussed above. Examples of such obstacles include walls, buildings, and dense foliage.

Once mapping of dynamic content units has been performed, dynamic content assigned to the mobile dynamic content units need to be displayed in the XR user device. In order to render the dynamic content at the device, first the XR overlay based on the mobile dynamic content unit projected to the XR user device reference frame. This aspect can also be taken into account in the mechanism for representing the dynamic content units for pricing in the RTB. In one scenario pricing of dynamic content units are defined by the size of the associated XR overlays in pixels, regardless of the perspective on which they are looked at. However, the perception of XR overlays can be quite different when perceived from up close or from far away. It can also be different if perceived straight in front or from an angle, especially for flat XR overlays. Therefore, in some embodiments, dynamic content units for purposes of bidding can be defined according to their projective representation (instead of geometric one).

When using projective mapping, an XR overlay for a mobile dynamic content units occupy a certain size of the XR user device display depending on the perspective on which they are viewed. The size in the XR user device display depends on the relative pose of the observer to the specific mobile dynamic content unit's geometric location. In other words, the same XR overlays will appear smaller from far away than from a close distance. And the size they seem to occupy might be different at different angles. Projected representation reduces mobile dynamic content unit dimensionality by one, since the three-dimensional representation of mobile dynamic content units get projected as XR overlays into a two-dimensional "display" plane. Projected size depends on the perspective, but not on the resolution of the display.

Once the dynamic content unit has been projected to the view plane, it needs to be rendered as an XR overlay according to the display it will be viewed. The XR overlays occupy certain size of the XR user device display depending on the projected size mapping. They are projected and rendered in 2D regardless of their dimensionality order. For any given relative pose of an XR overlay of a given geometric size, the number of pixels used for displaying the XR overlay will vary depending on the resolution of the display. Given this, an XR overlay of a given geometric size and relative pose to two different XR user devices with different resolutions will have the same rendered size in cm, but different rendered size in pixels 2.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 7 is a flowchart of one embodiment of a process of a set of electronic devices in the edgecloud that implements mobile dynamic content unit services. The process is described relative the operations at the devices implemented by the system of edgecloud, which can be implemented by any number of devices therein. The process can be triggered by any event that causes the XR user device to send location and pose information to the edgecloud (Block 701). Any amount and variety of information about the physical real world environment detected by sensors of the XR user device can be provided along with any state information about the XR user device. The dynamic content unit information is then determined for the relevant location and pose information of the XR user device (Block 701). The possible dynamic content units near the XR user device can be determined using any combination of the techniques described herein. The range of motion for each identified dynamic content unit is also determined (Block 705). The range of motion of the dynamic content units is determined using any of the techniques described herein.

In some embodiments, the received dynamic environment information (e.g., the location and pose information) can be discarded after the dynamic content units are determined (Block 707). This information can be discarded for resource consumption management, privacy, or similar concerns. The spatial map relevant to the XR user device is also determined and semantic information for the detected objects and real world features are also determined from the information received from the XR user device as well as other data collected by the edgecloud from other devices such as other XR user devices (Block 709). In some embodiments, the semantic information is derived from the received XR user device information (Block 711), while in other embodiments this information is separately collected and made available to the edgecloud. The spatial map and semantic information are combined to form the semantic map (Block 713). Any of the techniques discussed herein can be utilized to generate the semantic map. In some embodiments, the semantic map can be updated/stored in a local or remote database (Block 715) along with related semantic information. In some embodiments, any portion of the collected semantic information or the semantic map can be discarded after utilization/collection to conserve storage, resource usage, privacy, or similar concerns.

With the semantic map determined, the access controls relevant to the objects, locations, and similar entities can be applied to determine which dynamic content units can have which types (if any) dynamic content assigned to them (Block 719). Once the applicable access controls are identified then they can be applied to limit or filter the dynamic content units that are available for dynamic content or the type of dynamic content. A query can then be made to the dynamic content manager for dynamic content to be assigned to the dynamic content units via a RTB or similar process as described herein (Block 723). The dynamic content manager returns dynamic content that is assigned to each dynamic content unit (Block 725). In some embodiments, further access controls are applied to ensure that the type of dynamic content is appropriate for the current location or particular dynamic content unit as described herein (Block 727). The approved dynamic content is then returned to the XR user device to be displayed as described herein (Block 729). Returning the dynamic content to the XR user device can include one or more of: transmitting the actual dynamic content (e.g., for rendering by the user device into a scene), transmitting a link or pointer to the content (e.g., for retrieval by the device of the dynamic content for rendering by the user device), or transmitting a rendered image that includes the dynamic content (e.g., rendering occurs in the edgecloud, which returns one or more images of the dynamic content rendered into the scene). The dynamic content can be returned in these forms either separately or in combination with the associated dynamic content unit.

Figure 8:
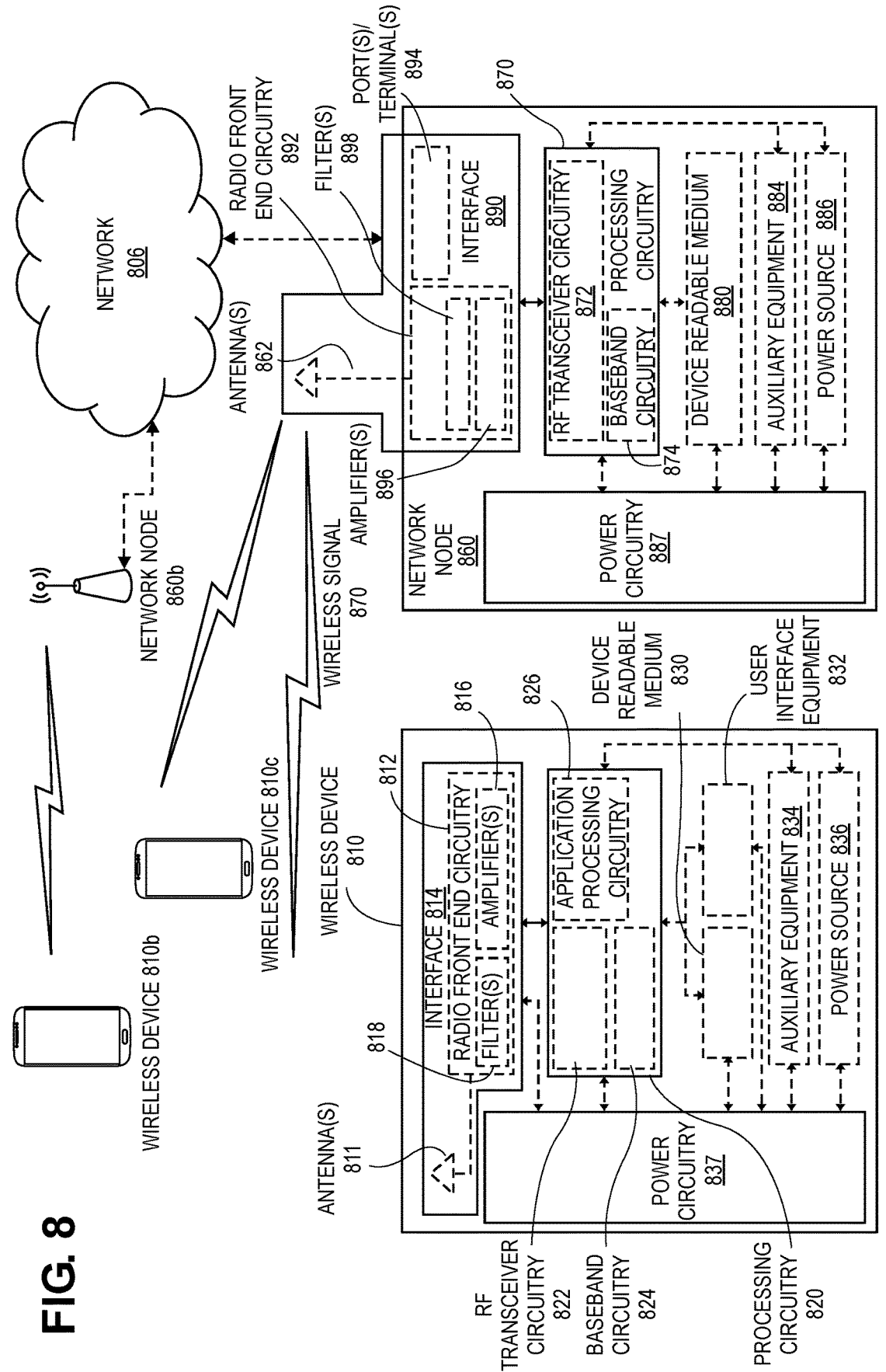
FIG. 8 is a diagram of one embodiment of a wireless network for supporting dynamic content unit services.

FIG. 8 is a diagram of one embodiment of a wireless network in accordance with some embodiments to provide XR overlay services. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network, or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and an RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, Wi-Fi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information, or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part, or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860 but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data, or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all, or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node, and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node, and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, Wi-Fi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send, and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some, or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part, or all of baseband processing circuitry 824 and application processing circuitry 826 may be combined into one chip or set of chips, and RF transceiver circuitry 822 may be on a separate chip or set of chips. In still alternative embodiments, part, or all of RF transceiver circuitry 822 and baseband processing circuitry 824 may be on the same chip or set of chips, and application processing circuitry 826 may be on a separate chip or set of chips. In yet other alternative embodiments, part, or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices, and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
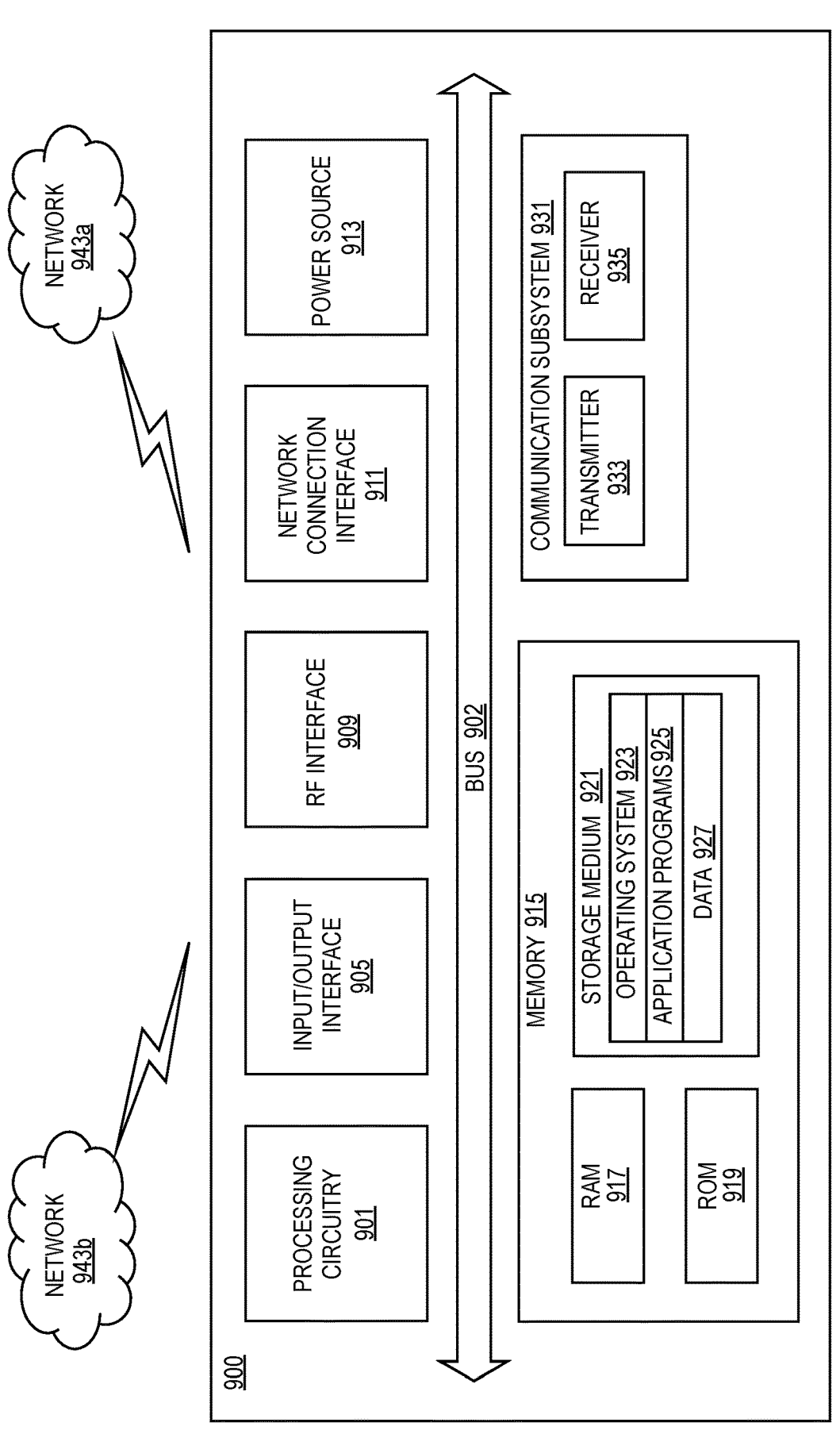
FIG. 9 is a diagram of one embodiment of user equipment for supporting XR overlay services.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the 3$^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943*a*. Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software, or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software, or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software, or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
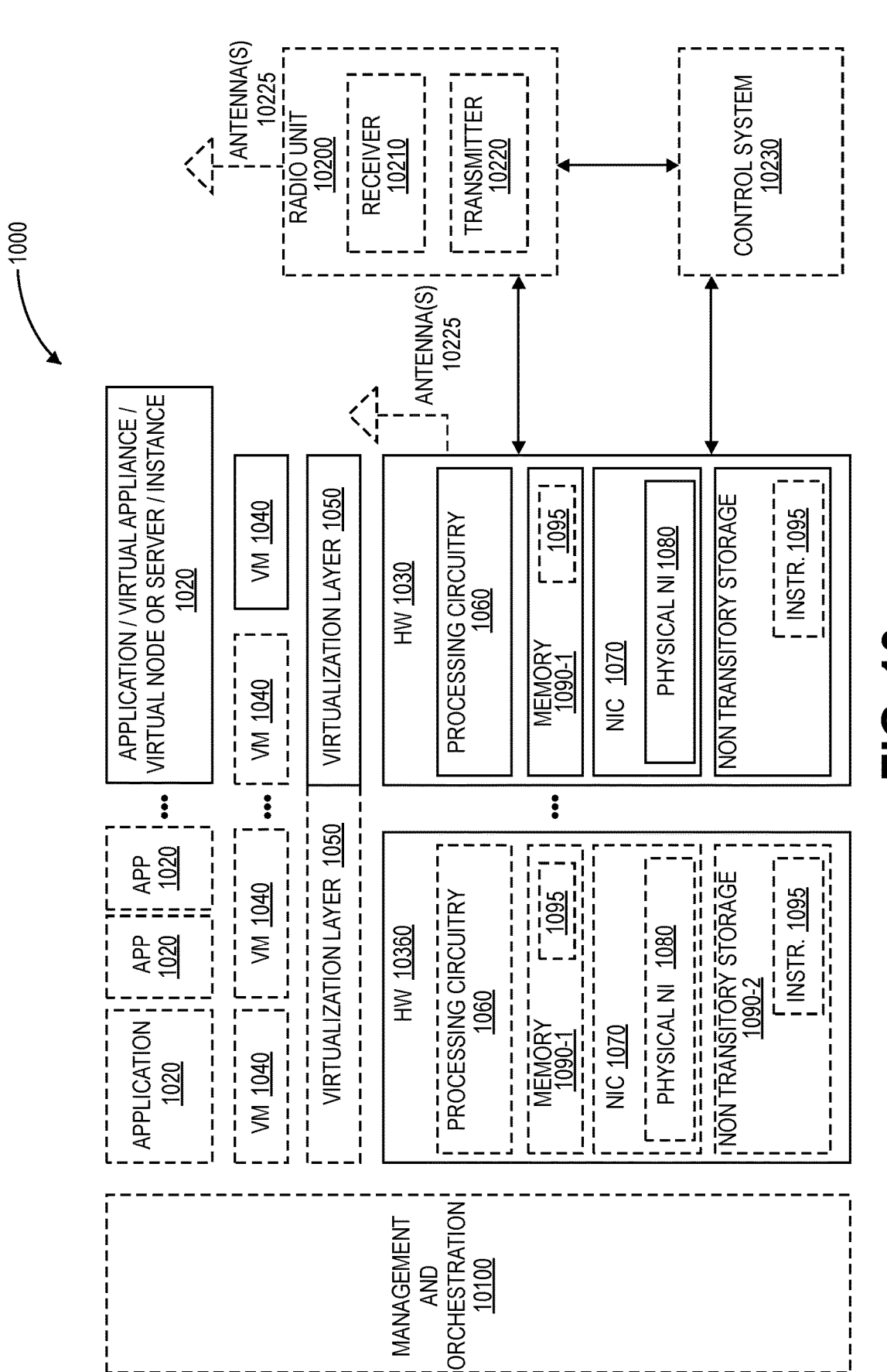
FIG. 10 is a diagram of one embodiment of a virtualization environment for supporting dynamic content unit services.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g., such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be affected with the use of control system 10230 which may alternatively be used for communication between the hardware nodes 1030 and radio units 10200.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between 1100A-1100B, 1100B-1100C, 1100C-1100D, 1100D-1100E, 1100E-1100F, 1100F-1100G, and 1100A-1100G, as well as between 1100H and each of 1100A, 1100C, 1100D, and 1100G. These NDs are physical devices, and the connectivity between these NDs can be wireless or wired (often referred to as a link). An additional line extending from NDs

1100A, 1100E, and 1100F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application—specific integrated—circuits (ASICs) and a special-purpose operating system (OS); and 2) a general purpose network device 1104 that uses common off-the-shelf (COTS) processors and a standard OS.

The special-purpose network device 1102 includes networking hardware 1110 comprising a set of one or more processor(s) 1112, forwarding resource(s) 1114 (which typically include one or more ASICs and/or network processors), and physical network interfaces (NIs) 1116 (through which network connections are made, such as those shown by the connectivity between NDs 1100A-H), as well as non-transitory machine readable storage media 1118 having stored therein networking software 1120. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A).

The networking software 1120 in some embodiments can implement any aspect of the XR overlay services 1165 described herein, including any of the functionality described as implemented by the edgecloud or the dynamic content manager as described herein.

The special-purpose network device 1102 is often physically and/or logically considered to include: 1) a ND control plane 1124 (sometimes referred to as a control plane) comprising the processor(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the processor(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general purpose network device 1104 includes hardware 1140 comprising a set of one or more processor(s) 1142 (which are often COTS processors) and physical NIs 1146, as well as non-transitory machine readable storage media 1148 having stored therein software 1150. During operation, the processor(s) 1142 execute the software 1150 to instantiate one or more sets of one or more applications 1164A-R. While one embodiment does not implement virtualization, alternative embodiments may use different forms of virtualization. For example, in one such alternative embodiment the virtualization layer 1154 represents the kernel of an operating system (or a shim executing on a base operating system) that allows for the creation of multiple instances 1162A-R called software containers that may each be used to execute one (or more) of the sets of applications 1164A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1154 represents a hypervisor (sometimes referred to as a virtual machine monitor (VMM)) or a hypervisor executing on top of a host operating system, and each of the sets of applications 1164A-R is run on top of a guest operating system within an instance 1162A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1140, directly on a hypervisor (in which case the unikernel is sometimes described as running within a LibOS virtual machine), or in a software container, embodiments can be implemented fully with unikernels running directly on a hypervisor represented by virtualization layer 1154, unikernels running within software containers represented by instances 1162A-R, or as a combination of unikernels and the above-described techniques (e.g., unikernels and virtual machines both run directly on a hypervisor, unikernels and sets of applications that are run in different software containers).

The networking software 1150 in some embodiments can implement any aspect of the XR overlay services 1165 described herein, including any of the functionality described as implemented by the edgecloud or the dynamic content manager as described herein.

The instantiation of the one or more sets of one or more applications 1164A-R, as well as virtualization if implemented, are collectively referred to as software instance(s) 1152. Each set of applications 1164A-R, corresponding virtualization construct (e.g., instance 1162A-R) if implemented, and that part of the hardware 1140 that executes them (be it hardware dedicated to that execution and/or time slices of hardware temporally shared), forms a separate virtual network element(s) 1160A-R.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1162A-R to VNEs also apply to embodiments where such a finer level of granularity and/or unikernels are used.

In certain embodiments, the virtualization layer 1154 includes a virtual switch that provides similar forwarding services as a physical Ethernet switch. Specifically, this virtual switch forwards traffic between instances 1162A-R and the physical NI(s) 1146, as well as optionally between the instances 1162A-R; in addition, this virtual switch may enforce network isolation between the VNEs 1160A-R that by policy are not permitted to communicate with each other (e.g., by honoring virtual local area networks (VLANs)).

The third exemplary ND implementation in FIG. 11A is a hybrid network device 1106, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1130A-R, VNEs 1160A-R, and those in the hybrid network device 1106) receives data on the physical NIs (e.g., 1116, 1146) and forwards that data out the appropriate ones of the physical NIs (e.g., 1116, 1146). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 11C illustrates various exemplary ways in which VNEs may be coupled according to some embodiments of the invention. FIG. 11C shows VNEs 1170A.1-1170A.P (and optionally VNEs 1170A.Q-1170A.R) implemented in ND 1100A and VNE 1170H.1 in ND 1100H. In FIG. 11C, VNEs 1170A.1-P are separate from each other in the sense that they can receive packets from outside ND 1100A and forward packets outside of ND 1100A; VNE 1170A.1 is coupled with VNE 1170H.1, and thus they communicate packets between their respective NDs; VNE 1170A.2-1170A.3 may optionally forward packets between themselves without forwarding them outside of the ND 1100A; and VNE 1170A.P may optionally be the first in a chain of VNEs that includes VNE 1170A.Q followed by VNE 1170A.R (this is sometimes referred to as dynamic service chaining, where each of the VNEs in the series of VNEs provides a different service—e.g., one or more layer 4-7 network services). While FIG. 11C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 11A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 11A may also host one or more such servers (e.g., in the case of the general purpose network device 1104, one or more of the software instances 1162A-R may operate as servers; the same would be true for the hybrid network device 1106; in the case of the special-purpose network device 1102, one or more such servers could also be run on a virtualization layer executed by the processor(s) 1112); in which case the servers are said to be co-located with the VNEs of that ND.

A virtual network is a logical abstraction of a physical network (such as that in FIG. 11A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 11D illustrates a network with a single network element on each of the NDs of FIG. 11A, and within this straight forward approach contrasts a traditional distributed approach (commonly used by traditional routers) with a centralized approach for maintaining reachability and forwarding information (also called network control), according to some embodiments of the invention. Specifically, FIG.

11D illustrates network elements (NEs) 1170A-H with the same connectivity as the NDs 1100A-H of FIG. 11A.

FIG. 11D illustrates that the distributed approach 1172 distributes responsibility for generating the reachability and forwarding information across the NEs 1170A-H; in other words, the process of neighbor discovery and topology discovery is distributed.

For example, where the special-purpose network device 1102 is used, the control communication and configuration module(s) 1132A-R of the ND control plane 1124 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1170A-H (e.g., the processor(s) 1112 executing the control communication and configuration module(s) 1132A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1124. The ND control plane 1124 programs the ND forwarding plane 1126 with information (e.g., adjacency and route information) based on the routing structure(s). For example, the ND control plane 1124 programs the adjacency and route information into one or more forwarding table(s) 1134A-R (e.g., Forwarding Information Base (FIB), Label Forwarding Information Base (LFIB), and one or more adjacency structures) on the ND forwarding plane 1126. For layer 2 forwarding, the ND can store one or more bridging tables that are used to forward data based on the layer 2 information in that data. While the above example uses the special-purpose network device 1102, the same distributed approach 1172 can be implemented on the general purpose network device 1104 and the hybrid network device 1106.

FIG. 11D illustrates that a centralized approach 1174 (also known as software defined networking (SDN)) that decouples the system that makes decisions about where traffic is sent from the underlying systems that forwards traffic to the selected destination. The illustrated centralized approach 1174 has the responsibility for the generation of reachability and forwarding information in a centralized control plane 1176 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1176 has a south bound interface 1182 with a data plane 1180 (sometime referred to the infrastructure layer, network forwarding plane, or forwarding plane (which should not be confused with a ND forwarding plane)) that includes the NEs 1170A-H (sometimes referred to as switches, forwarding elements, data plane elements, or nodes). The centralized control plane 1176 includes a network controller 1178, which includes a centralized reachability and forwarding information module 1179 that determines the reachability within the network and distributes the forwarding information to the NEs 1170A-H of the data plane 1180 over the south bound interface 1182 (which may use the OpenFlow protocol). Thus, the network intelligence is centralized in the centralized control plane 1176 executing on electronic devices that are typically separate from the NDs.

For example, where the special-purpose network device 1102 is used in the data plane 1180, each of the control communication and configuration module(s) 1132A-R of the ND control plane 1124 typically include a control agent that provides the VNE side of the south bound interface 1182. In this case, the ND control plane 1124 (the processor(s) 1112 executing the control communication and configuration module(s) 1132A-R) performs its responsibility for participating in controlling how data (e.g., packets) is to be routed (e.g., the next hop for the data and the outgoing physical NI for that data) through the control agent communicating with the centralized control plane 1176 to receive the forwarding information (and in some cases, the reachability information) from the centralized reachability and forwarding information module 1179 (it should be understood that in some embodiments of the invention, the control communication and configuration module(s) 1132A-R, in addition to communicating with the centralized control plane 1176, may also play some role in determining reachability and/or calculating forwarding information—albeit less so than in the case of a distributed approach; such embodiments are generally considered to fall under the centralized approach 1174, but may also be considered a hybrid approach).

While the above example uses the special-purpose network device 1102, the same centralized approach 1174 can be implemented with the general purpose network device 1104 (e.g., each of the VNE 1160A-R performs its responsibility for controlling how data (e.g., packets) is to be routed (e.g., the next hop for the data and the outgoing physical NI for that data) by communicating with the centralized control plane 1176 to receive the forwarding information (and in some cases, the reachability information) from the centralized reachability and forwarding information module 1179; it should be understood that in some embodiments of the invention, the VNEs 1160A-R, in addition to communicating with the centralized control plane 1176, may also play some role in determining reachability and/or calculating forwarding information—albeit less so than in the case of a distributed approach) and the hybrid network device 1106. In fact, the use of SDN techniques can enhance the NFV techniques typically used in the general purpose network device 1104 or hybrid network device 1106 implementations as NFV is able to support SDN by providing an infrastructure upon which the SDN software can be run, and NFV and SDN both aim to make use of commodity server hardware and physical switches.

FIG. 11D also shows that the centralized control plane 1176 has a north bound interface 1184 to an application layer 1186, in which resides application(s) 1188. The centralized control plane 1176 has the ability to form virtual networks 1192 (sometimes referred to as a logical forwarding plane, network services, or overlay networks (with the NEs 1170A-H of the data plane 1180 being the underlay network)) for the application(s) 1188. Thus, the centralized control plane 1176 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

The application layer 1186 in some embodiments can implement any aspect of the XR overlay services 1165 described herein, including any of the functionality described as implemented by the edgecloud or the dynamic content manager as described herein.

While FIG. 11D shows the distributed approach 1172 separate from the centralized approach 1174, the effort of network control may be distributed differently or the two combined in certain embodiments of the invention. For example: 1) embodiments may generally use the centralized approach (SDN) 1174, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1174, but may also be considered a hybrid approach.

While FIG. 11D illustrates the simple case where each of the NDs 1100A-H implements a single NE 1170A-H, it should be understood that the network control approaches described with reference to FIG. 11D also work for networks where one or more of the NDs 1100A-H implement multiple VNEs (e.g., VNEs 1130A-R, VNEs 1160A-R, those in the hybrid network device 1106). Alternatively or in addition, the network controller 1178 may also emulate the implementation of multiple VNEs in a single ND. Specifically, instead of (or in addition to) implementing multiple VNEs in a single ND, the network controller 1178 may present the implementation of a VNE/NE in a single ND as multiple VNEs in the virtual networks 1192 (all in the same one of the virtual network(s) 1192, each in different ones of the virtual network(s) 1192, or some combination). For example, the network controller 1178 may cause an ND to implement a single VNE (a NE) in the underlay network, and then logically divide up the resources of that NE within the centralized control plane 1176 to present different VNEs in the virtual network(s) 1192 (where these different VNEs in the overlay networks are sharing the resources of the single VNE/NE implementation on the ND in the underlay network).

On the other hand, FIGS. 11E and 11F respectively illustrate exemplary abstractions of NEs and VNEs that the network controller 1178 may present as part of different ones of the virtual networks 1192. FIG. 11E illustrates the simple case of where each of the NDs 1100A-H implements a single NE 1170A-H (see FIG. 11D), but the centralized control plane 1176 has abstracted multiple of the NEs in different NDs (the NEs 1170A-C and G-H) into (to represent) a single NE 1170I in one of the virtual network(s) 1192 of FIG. 11D, according to some embodiments of the invention. FIG. 11E shows that in this virtual network, the NE 1170I is coupled to NE 1170D and 1170F, which are both still coupled to NE 1170E.

FIG. 11F illustrates a case where multiple VNEs (VNE 1170A.1 and VNE 1170H.1) are implemented on different NDs (ND 1100A and ND 1100H) and are coupled to each other, and where the centralized control plane 1176 has abstracted these multiple VNEs such that they appear as a single VNE 1170T within one of the virtual networks 1192 of FIG. 11D, according to some embodiments of the invention. Thus, the abstraction of a NE or VNE can span multiple NDs.

While some embodiments of the invention implement the centralized control plane 1176 as a single entity (e.g., a single instance of software running on a single electronic device), alternative embodiments may spread the functionality across multiple entities for redundancy and/or scalability purposes (e.g., multiple instances of software running on different electronic devices).

Figure 12:
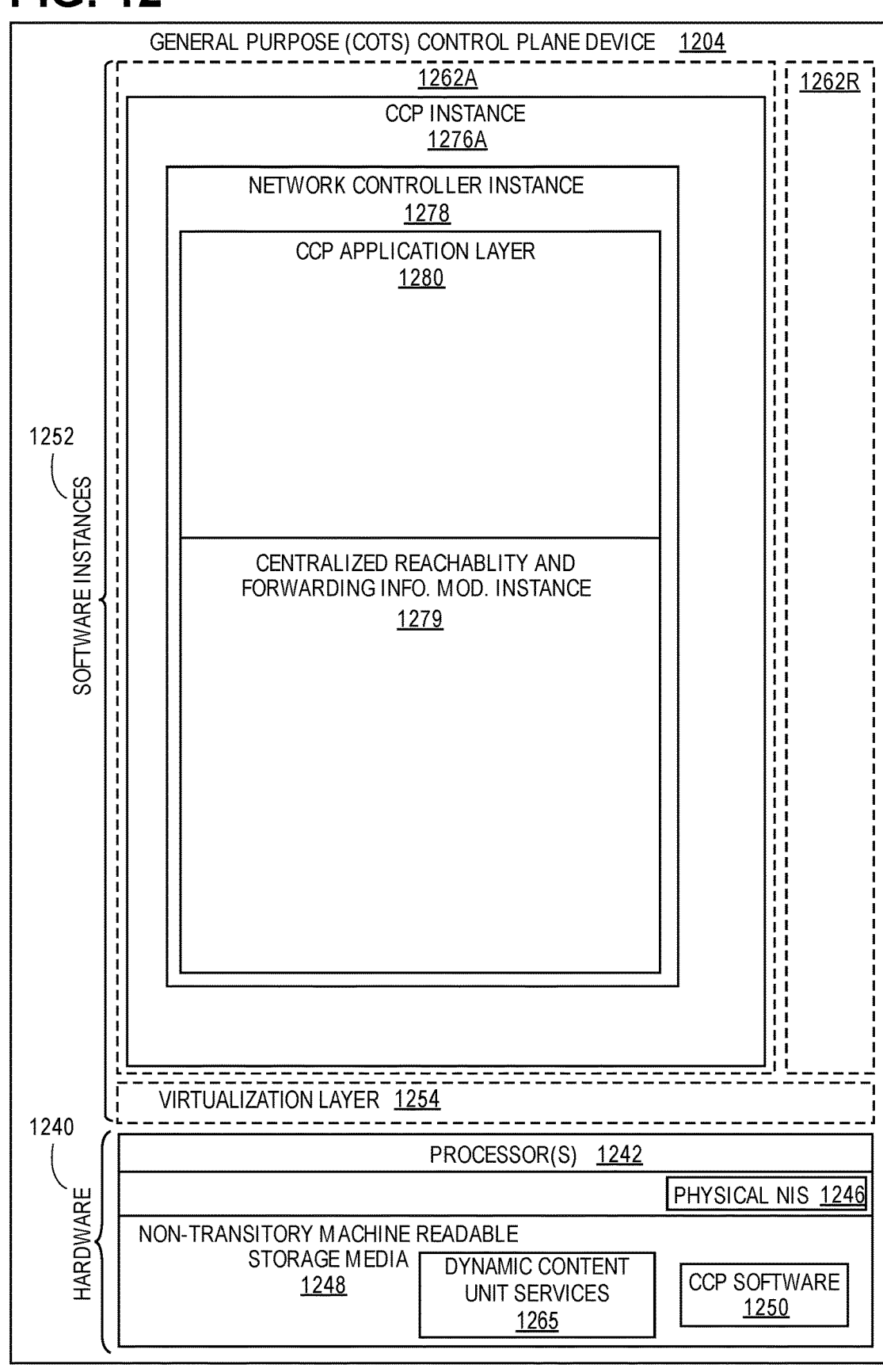
FIG. 12 illustrates a general purpose control plane device with centralized control plane (CCP) software 1350), according to some embodiments of the invention.

Similar to the network device implementations, the electronic device(s) running the centralized control plane 1176, and thus the network controller 1178 including the centralized reachability and forwarding information module 1179, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 12 illustrates, a general purpose control plane device 1204 including hardware 1240 comprising a set of one or more processor(s) 1242 (which are often COTS processors) and physical NIs 1246, as well as non-transitory machine readable storage media 1248 having stored therein centralized control plane (CCP) software 1250.

The non-transitory machine readable storage media 1248 in some embodiments can implement any aspect of the XR overlay services 1265 described herein, including any of the functionality described as implemented by the edgecloud or the dynamic content manager as described herein.

In embodiments that use compute virtualization, the processor(s) 1242 typically execute software to instantiate a virtualization layer 1254 (e.g., in one embodiment the virtualization layer 1254 represents the kernel of an operating system (or a shim executing on a base operating system) that allows for the creation of multiple instances 1262A-R called software containers (representing separate user spaces and also called virtualization engines, virtual private servers, or jails) that may each be used to execute a set of one or more applications; in another embodiment the virtualization layer 1254 represents a hypervisor (sometimes referred to as a virtual machine monitor (VMM)) or a hypervisor executing on top of a host operating system, and an application is run on top of a guest operating system within an instance 1262A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1240, directly on a hypervisor represented by virtualization layer 1254 (in which case the unikernel is sometimes described as running within a LibOS virtual machine), or in a software container represented by one of instances 1262A-R). Again, in embodiments where compute virtualization is used, during operation an instance of the CCP software 1250 (illustrated as CCP instance 1276A) is executed (e.g., within the instance 1262A) on the virtualization layer 1254. In embodiments where compute virtualization is not used, the CCP instance 1276A is executed, as a unikernel or on top of a host operating system, on the "bare metal" general purpose control plane device 1204. The instantiation of the CCP instance 1276A, as well as the virtualization layer 1254 and instances 1262A-R if implemented, are collectively referred to as software instance(s) 1252.

In some embodiments, the CCP instance 1276A includes a network controller instance 1278. The network controller instance 1278 includes a centralized reachability and forwarding information module instance 1279 (which is a middleware layer providing the context of the network controller 1178 to the operating system and communicating with the various NEs), and an CCP application layer 1280 (sometimes referred to as an application layer) over the middleware layer (providing the intelligence required for various network operations such as protocols, network situational awareness, and user—interfaces). At a more abstract level, this CCP application layer 1280 within the centralized control plane 1176 works with virtual network view(s) (logical view(s) of the network) and the middleware layer provides the conversion from the virtual networks to the physical view.

The centralized control plane 1176 transmits relevant messages to the data plane 1180 based on CCP application layer 1280 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1180 may receive different messages, and thus different forwarding information. The data plane 1180 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1180, the packet (or a subset of the packet header and content) is typically forwarded to the centralized control plane 1176. The centralized control plane 1176 will then program forwarding table entries into the data plane 1180 to accommodate packets belonging to the flow of the unknown packet. Once a specific forwarding table entry has been programmed into the data plane 1180 by the centralized control plane 1176, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a system of one or more electronic devices to support an extended reality application at a user device, the method comprising:

receiving, from the user device, location and pose information of the user device related to an extended reality environment of the extended reality application;

determining at least one dynamic content unit, in the extended reality environment, relevant to the location and pose information of the user device, wherein the at least one dynamic content unit is defined in three dimensions, and can be projected or rendered in extended reality in two or three dimensions based on perspective and distance relative to the user device;

determining a range of motion of the at least one dynamic content unit, wherein the at least one dynamic content unit moves through the extended reality environment;

determining semantic information for the location and pose of the user device;

generating a semantic map from the semantic information;

determining at least one access control that applies to the semantic map;

applying the at least one access control to the semantic map to prevent display of dynamic content on the at least one dynamic content unit at a location in the semantic map;

querying a dynamic content manager for dynamic content to be displayed on the at least one dynamic content unit; and returning the dynamic content to the user device.

2. The method of claim 1, further comprising:

receiving dynamic environment information from the user device;

determining semantic information from the dynamic environment information; and generating the semantic map from the semantic information including the semantic information from the dynamic environment information.

3. The method of claim 1, wherein the at least one access control prevents display of dynamic content based on semantic information from static environment information.

4. The method of claim 1, wherein the at least one access control prevents display of dynamic content based on semantic information from dynamic environment information.

5. The method of claim 1, further comprising:

monitoring dynamic environment information including location and position information of the user device and location information of an extended reality overlay; and applying at least one access control to the dynamic content based on dynamic environment information.

6. The method of claim 5, wherein applying the at least one access control prevents display of the dynamic content over one or more static or dynamic objects in the semantic map that belong to one or more restricted class of objects.

7. A system of one or more electronic devices to support an extended reality application at a user device, the system comprising:

a non-transitory machine-readable medium having stored therein dynamic content unit services; and one or more processor coupled to the non-transitory machine-readable medium, the one or more processor to execute the dynamic content unit services, the dynamic content unit services to receive, from the user device, location and pose information of the user device related to an extended reality environment of the extended reality application, determine at least one dynamic content unit, in the extended reality environment, relevant to the location and pose information of the user device, wherein the at least one dynamic content unit is defined in three dimensions, and can be projected or rendered in extended reality in two or three dimensions based on perspective and distance relative to the user device, determine a range of motion of the at least one dynamic content unit, wherein the at least one dynamic content unit moves through the extended reality environment, determine semantic information for the location and pose of the user device, generate a semantic map from the semantic information, determine at least one access control that applies to the semantic map, apply the at least one access control to the semantic map to prevent display of dynamic content on the at least one dynamic content unit at a location in the semantic map, query a dynamic content manager for dynamic content to be displayed as an extended reality overlay, and return the dynamic content to the user device.

8. The system of one or more electronic devices to support an extended reality application at a user device of claim 7, wherein the dynamic content unit services are further to receive dynamic environment information from the user device, determine semantic information from the dynamic environment information, and generate the semantic map from the semantic information including the semantic information from the dynamic environment information.

9. The system of one or more electronic devices to support an extended reality application at a user device of claim 7, wherein the at least one access control prevents display of dynamic content based on semantic information from static environment information.

10. The system of one or more electronic devices to support an extended reality application at a user device of claim 7, wherein the at least one access control prevents display of dynamic content based on semantic information from dynamic environment information.

11. The system of one or more electronic devices to support an extended reality application at a user device of claim 7, wherein the dynamic content unit services are further to monitor dynamic environment information including location and position information of the user device and location information of the extended reality overlay, and apply at least one access control to the dynamic content based on dynamic environment information.

12. The system of one or more electronic devices to support an extended reality application at a user device of claim 11, wherein applying the at least one access control prevents display of the dynamic content over one or more static or dynamic objects in the semantic map that belong to one or more restricted class of objects.

13. A non-transitory machine-readable medium having stored therein a set of instructions, which when executed by an electronic device cause the electronic device to perform a set of operations, the set of operations comprising:

receiving, from a user device, location and pose information of the user device related to an extended reality environment of an extended reality application;

determining at least one dynamic content unit, in the extended reality environment, relevant to the location and pose information of the user device, wherein the at least one dynamic content unit is defined in three dimensions, and can be projected or rendered in extended reality in two or three dimensions based on perspective and distance relative to the user device;

determining a range of motion of the at least one dynamic content unit, wherein the at least one dynamic content unit moves through the extended reality environment;

determining semantic information for the location and pose of the user device;

generating a semantic map from the semantic information;

determining at least one access control that applies to the semantic map;

applying the at least one access control to the semantic map to prevent display of dynamic content on the at least one dynamic content unit at a location in the semantic map;

querying a dynamic content manager for dynamic content to be displayed as an extended reality overlay; and returning the dynamic content to the user device.

14. The non-transitory machine-readable medium of claim 13, having further instructions stored therein, which when executed by the electronic device cause the electronic device to perform further operations comprising:

receiving dynamic environment information from the user device;

determining semantic information from the dynamic environment information; and generating the semantic map from the semantic information including the semantic information from the dynamic environment information.

15. The non-transitory machine-readable medium of claim 13, wherein the at least one access control prevents display of dynamic content based on semantic information from static environment information.

16. The non-transitory machine-readable medium of claim 13, wherein the at least one access control prevents display of dynamic content based on semantic information from dynamic environment information.

17. The non-transitory machine-readable medium of claim 13, further comprising:

monitoring dynamic environment information including location and position information of the user device and location information of the extended reality overlay; and applying at least one access control to the dynamic content based on dynamic environment information.

18. The non-transitory machine-readable medium of claim 17, wherein applying the at least one access control prevents display of the dynamic content over one or more static or dynamic objects in the semantic map that belong to one or more restricted class of objects.

\* \* \* \* \*